United States Patent
Akhavain Mohammadi

(10) Patent No.: US 10,142,248 B2
(45) Date of Patent: Nov. 27, 2018

(54) PACKET MIS-ORDERING PREVENTION IN SOURCE ROUTING HITLESS REROUTE USING INTER-PACKET DELAY AND PRECOMPENSATION

(71) Applicant: Huawei Technologies Co., Ltd., Shenzhen (CN)

(72) Inventor: Mehdi Arashmid Akhavain Mohammadi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 14/869,110

(22) Filed: Sep. 29, 2015

(65) Prior Publication Data
US 2017/0093732 A1    Mar. 30, 2017

(51) Int. Cl.
| | |
|---|---|
| *H04L 12/823* | (2013.01) |
| *H04L 12/741* | (2013.01) |
| *H04L 12/727* | (2013.01) |
| *H04L 12/721* | (2013.01) |
| *H04L 12/707* | (2013.01) |

(52) U.S. Cl.
CPC .......... *H04L 47/32* (2013.01); *H04L 45/121* (2013.01); *H04L 45/22* (2013.01); *H04L 45/38* (2013.01); *H04L 45/72* (2013.01); *H04L 45/74* (2013.01)

(58) Field of Classification Search
CPC ......... H04L 47/32; H04L 47/15; H04L 45/74; H04L 45/50; H04L 12/56; H02W 40/24
See application file for complete search history.

(56) References Cited

U.S. PATENT DOCUMENTS

| | | | |
|---|---|---|---|
| 5,777,988 A | 7/1998 | Cisneros | |
| 2006/0133430 A1* | 6/2006 | Nagesh | H04J 3/1617 370/536 |
| 2014/0313996 A1* | 10/2014 | Suga | H04W 56/0045 370/329 |
| 2015/0188804 A1 | 7/2015 | Ashwood-Smith | |
| 2017/0078176 A1* | 3/2017 | Lakshmikantha | H04L 43/0852 |

FOREIGN PATENT DOCUMENTS

| | | |
|---|---|---|
| CN | 101404622 A | 4/2009 |
| EP | 1011291 A2 | 6/2000 |

OTHER PUBLICATIONS

Partial English Translation and Abstract of Chinese Patent Application No. CN101404622, Apr. 8, 2009, 23 pages.
Foreign Communication From a Counterpart Application, PCT Application No. PCT/CN2016/100628, International Search Report dated Nov. 30, 2016, 4 pages.
Smith, "System and Method for Source Routing with One or More Delay Segments," U.S. Appl. No. 14/587,939, filed Dec. 31, 2014, 50 pages.

* cited by examiner

*Primary Examiner* — Kent Krueger
(74) *Attorney, Agent, or Firm* — Conley Rose, P.C.

(57) ABSTRACT

A method implemented by a network element (NE), comprising forwarding one or more initial packets in a packet flow from a source to a destination along an initial route having an initial route packet delay, obtaining an updated route having an updated route packet delay less than the initial route packet delay, and delaying transmission of a subsequent packet over the updated route by an amount of time determined in accordance with the initial route packet delay, the updated route packet delay and an inter-packet delay associated with the packet flow.

20 Claims, 16 Drawing Sheets

PACKET MIS-ORDERING PREVENTION IN SOURCE ROUTING HITLESS REROUTE USING INTER-PACKET DELAY AND PRECOMPENSATION

BACKGROUND

Source routing is a routing technique in which the route by which a packet traverses a network segment is specified, typically within a source route header. The source route header may comprise a strict list or a loose list of links and/or nodes to traverse. A strict list explicitly lists all of the links and/or nodes a packet may be transported over. A loose list can specify one or more links and/or nodes that the packet may traverse through to reach a destination, but the loose list may not include all the links and/or nodes that a packet traverses to reach the destination. Implementing source routing may simplify data forwarding network nodes (e.g., routers or switches) and reduce routing time and latency when compared to using a forwarding table. Instead of performing lookup functions using the forwarding table, a network node can use the routing information within the source route header to forward the data packet.

SUMMARY

In one embodiment, the disclosure includes a method for minimizing an amount of delay required to prevent packet mis-ordering during a reroute in source routing. The method is implemented by a network element (NE) in a source routed network. The method comprises forwarding one or more packets in a packet flow from a source to a destination along an initial route and obtaining an inter-packet delay associated with the packet flow. The NE is a head end of the source routed network that receives the packets from the source and routes the packets over the initial route. The method further comprises rerouting a subsequent packet in the packet flow along an updated route, wherein the updated route comprises less delay than the initial route. The method further comprises determining a path delay difference between the initial route and the updated route. The method further computes a minimum delay for preventing packet mis-ordering in the packet flow by reducing the path delay difference according to the inter-packet delay. The method further comprises introducing the minimum delay into the packet flow by delaying transmissions of one or more packets along the updated route, creating artificial delays along the initial route, or combinations thereof.

In another embodiment, the disclosure includes an NE. The NE comprises a transmitter and a receiver configured to couple to a source routing network. The NE further comprises a processor coupled to the transmitter and the receiver. The processor is configured to send a configuration message, via the transmitter, to an ingress node of the network to provide an initial source route for forwarding one or more packets in a packet flow from a source to a destination, wherein successive packets are separated by an inter-packet delay that is about zero. The processor is further configured to send a switch message, via the transmitter, to the ingress network node to indicate a reroute by providing an updated source route for forwarding a subsequent packet in the packet flow, wherein the updated source route comprises less delay than the initial source route. The processor is further configured to receive an inter-packet delay associated with the packet flow and determine a minimal amount of additional delay for the packet flow for preventing packet mis-ordering in the packet flow during the reroute by utilizing the inter-packet delay. The processor is further configured to send a packet delay message, via the transmitter, to a first network node to instruct the first network node to delay transmissions of one or more packets in the packet flow by at least a portion of the additional delay.

In yet another embodiment, the disclosure includes a transmitter and a receiver coupled to the source routing network. The NE further comprises a processor coupled to the transmitter and receiver. The processor is configured to forward, via the transmitter, one or more packets in a packet flow between a source and a destination along an initial source route comprising an initial path delay, wherein successive initial packets are separated by an inter-packet delay. The processor is further configured to receive, via a receiver, a reroute request to switch from the initial source route to an updated source route that comprises an updated path delay that is less than the initial path delay. The processor is further configured to obtain an additional delay that is minimized according to the inter-packet delay, forward, via the transmitter, a subsequent packet in the packet flow along the updated source route. The processor is further configured to delay transmission of at least some packets in the packet flow for a duration of at least a portion of the additional delay when a path delay difference between the initial path delay and the updated path delay is greater than the inter-packet delay.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
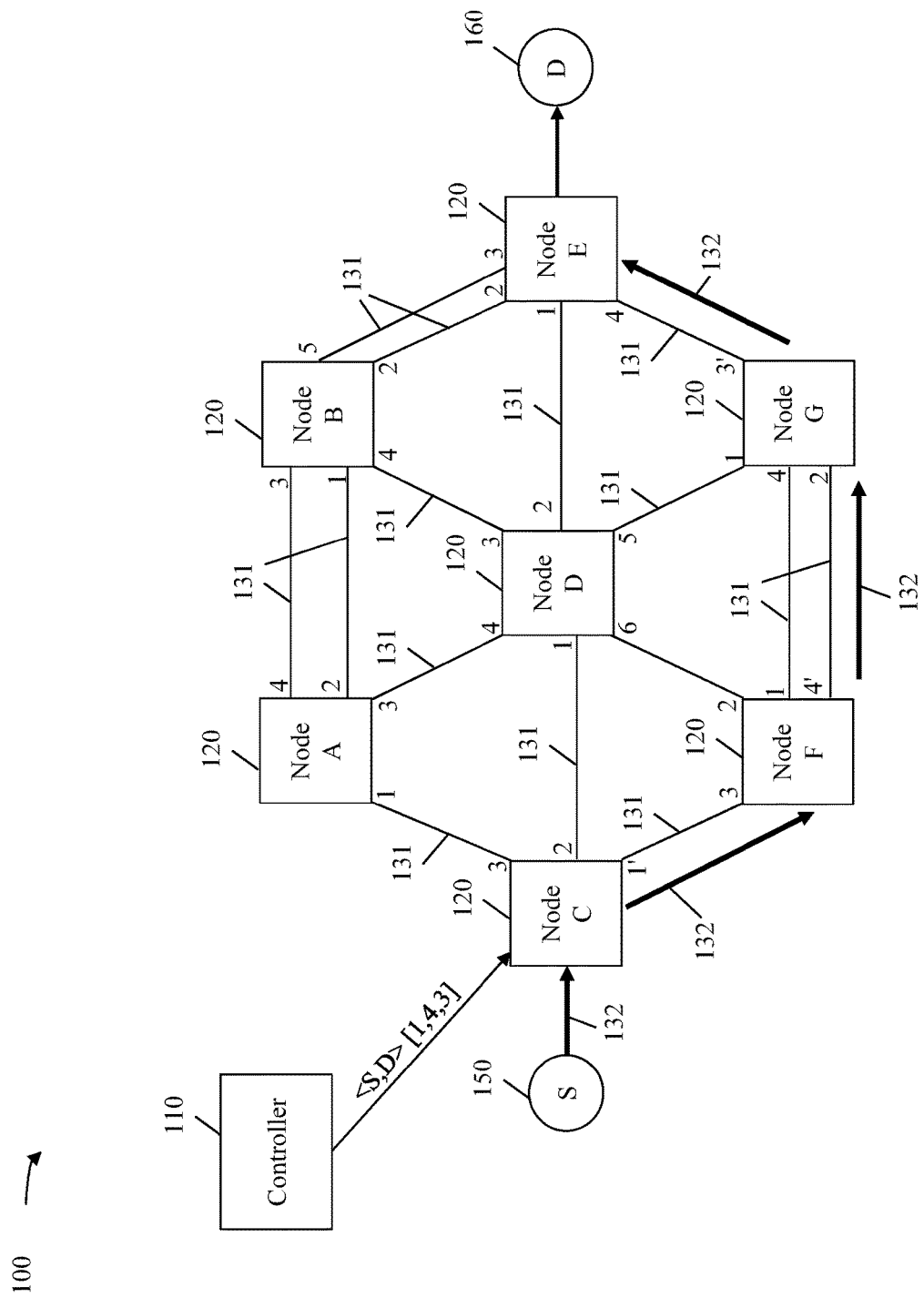
FIG. 1 is a schematic diagram of an embodiment of a source routing network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Source routing is characterized by a network with no per path state on tandem network devices and/or nodes, which may be routers, switches, and/or bridges. Source routing may be employed in different network architectures, including Internet protocol (IP) networks, multiprotocol label switching (MPLS) networks, asynchronous transfer mode (ATM) networks, software-defined networking (SDN)-based networks, and any other suitable network architectures. Network traffic or packet flows are often rerouted for various administrative and/or operational reasons. A packet flow refers to a sequence of packets that traverse a network from a source to a destination. A packet flow may be rerouted from an initial path to an updated path for a number of reasons, such as load balancing, avoiding outages, improving network performance or to allow for planned network maintenance.

Different network paths comprise different characteristics, such as path delays, which may depend on various factors, such as the topological path length and per node latency. When rerouting or switching a packet flow from an initial route (e.g., an old path) to an updated route (e.g., a new path), the order of the packets in the packet flow may be disrupted if the new path has a lower path delay than the initial path. In such cases, at least some of the packets will reach the destination out of order. One approach to preventing packet mis-ordering during the reroute is to introduce delays into the updated route. These introduced delays allow packets transmitted along the initial route to reach the destination before the packets transmitted along the updated route. Some schemes determine the amount of delays according to the path delay difference between the initial route and the updated route and distribute the delays at one or more network nodes along the updated route prior to reaching the destination. However, delaying packet transmissions at a network node may be expensive (e.g., in terms of buffer and/or memory space). For example, a network node may delay the transmission of a packet received from a packet flow by holding the packet in memory or one or more buffers for a duration of delay time (e.g., a wait period) prior to transmitting the packet to a next hop node along a forwarding path. During the wait period, the network node may continue to receive packets from the packet flow and may store the packets in the buffers. Depending on the buffer size available in the network node and the duration of the wait period, packets may build up in the buffers and may potentially cause the network node to drop packets when the buffers overflow. Thus, introducing delays into a packet flow may affect network resource usage efficiency and/or network performance.

Disclosed herein are embodiments for minimizing an amount of delay required to mitigate or prevent packet mis-ordering during a source routing reroute. For example, a packet flow is rerouted from an initial route (e.g., a previous path) to an updated route (e.g., a current path) with a lower delay than the initial route. The initial route and the updated route may also be referred to as source routes, which transport source-routed packets comprising source route headers embedded with routing information. In order to prevent packet mis-ordering during the reroute of the packet flow, an additional delay is introduced into the packet flow along the updated route to compensate for the path delay difference between the initial route and the updated route. For example, an additional delay is introduced into a packet flow by delaying transmissions of packets at a node, such as the node performing the change in paths or at any other node in the new path. In one embodiment, the added delay is reduced to take advantage of the inter-packet delay in the packet flow. The delay different in the paths, less the inter-packet delay, is the delay that must be accounted for (when the path delay less the inter-packet delay is greater than zero). The inter-packet delay may be referred to as the inherent inter-packet delay and it typically refers to a time gap between successive packets in the packet flow. Inter-packet delay is often a function of the rate at which the packets are generated. In a second embodiment, instead of introducing the full amount of additional delay at one time after switching to the updated route, for example, when transmitting a packet along the updated route for the first time, the disclosed embodiments build up the additional delay in the packet flow over a number of nodes along the updated route. For example, the additional delay may be built up by introducing an increasing amount of transmission delays over a plurality of successive packets to reduce jitters at the destination or at an end service. The disclosed embodiments may distribute the additional delay among a plurality of nodes along a forwarding path, for example, each node may delay the transmission of a packet by a portion of the additional delay. Alternatively, the disclosed embodiments may introduce the increasing delays for different packets at different nodes along the forwarding path.

FIG. 1 is a schematic diagram of an embodiment of a source routing network 100. The network 100 comprises a controller 110 and a plurality of network nodes 120 (e.g., Nodes A-G) interconnected by a plurality of links 131. The network 100 employs source routing to transport packets through the network nodes 120 between a source 150 and a destination 160. The source 150 may be any network device that is suitable for sourcing packets (e.g., to generate packets) and the destination 160 may be any network device that is suitable for sinking (e.g., to accept packets) packets. To employ source routing, the network nodes 120 operate under a single networking domain, which is also referred to as a source routing domain. In an embodiment, the network nodes 120 may be operating under one networking domain and the source 150 and/or the destination 160 may be operating under other networking domains, which may employ any types of routing methods. In another embodiment, the network nodes 120, the source 150, and/or the destination 160 may be operating under the same networking domain. The links 131 may comprise physical links, such as fiber optic links and/or electrical links, logical links (e.g. MPLS tunnels), and or combinations thereof used to transport data. Some of the network nodes are interconnected by parallel links 131, for example, between the network node B 120 and network node E 120. It should be noted that the source 150 and the destination 160 may not be directly connected to the network 100. For example, the source 150 and the destination 160 may be connected to their respective IP networks, which are interconnected by the network 100.

The controller 110 may be a virtual machine (VM), a hypervisor, or any other device configured to manage the network 100, for example, by maintaining the network topology and status of the network 100 and determining routes through the network 100. Also, note that the controller 110 may be communicatively coupled to all nodes 120 even though it is depicted as only connected to network node C 120. The controller 110 may be any type of network controller, such as a centralized controller or a distributed controller. In an embodiment, the controller 110 is an SDN controller, such as an OpenFlow-enabled controller. In such an embodiment, the forwarding plane is decoupled from the control plane, and the controller 110 configures each of the network nodes 120 with forwarding instructions, for example, in the form of one or more flow tables. In some embodiments, the network controller 110 may explicitly specify some or all connections and/or forwarding paths over which a data packet may traverse in the network 100. For example, the network controller 110 may provide a list of connections including a list of links 131 and/or network nodes 120 to a network node 120 that is configured to connect to a source 150.

The network nodes 120 may be switches, routers, bridges, and/or any other network devices suitable for forwarding data in the network 100. The network nodes 120 are configured to assign local identifiers to each of the links 131, including parallel links 131. For example, the network node C 120 may identify the links 131 connected to the network node A, D, and F 120 by identifiers 3, 2, and 1, respectively. In an embodiment of an SDN-based network, the network nodes 120 receives forwarding instructions from the controller 110 and forward data packets in the network 100 according to the received forwarding instructions. In the network 100, the network nodes 120 may act as an ingress node, an egress node, and/or a tandem node for one or more packet flows, for example, associated with different sources 150 and/or different destinations 160.

When a network node 120 is an ingress node, it is configured to direct packets received from a source 150 through the network 100 towards the destination node 160. For example, the network node 120 receives a plurality of routes from the network controller 110 for routing packets through the network 100 and stores the plurality of routes, for example, in a flow table or any other forwarding information bases. Upon receiving a packet from the source 150, the network node 120 identifies a route (e.g., via source-destination match) stored in the flow table, encapsulates the packet with the route (e.g., carried in the header), and forwards the packet to a next hop node according to the identified route.

When a network node 120 is a tandem node (also referred to as an intermediate node) it is physically and/or logically located between an ingress node and an egress node of a forwarding path. Tandem network node 120 is configured to receive and forwards packets in network 100 via stateless connections. For example, when the network node 120 receives a packet from an upstream node (e.g., towards a source 150), the network node 120 forwards the packet to a downstream node (e.g., towards a destination 160) according to the route information carried in the header without referencing a connection specific table. It should be noted that the tandem node may also be referred to as an intermediate node.

When a network node 120 is an egress node, the network node 120 is configured to deliver packets to a destination 160 of the packets. For example, upon receiving a packet for the destination 160, the network node 120 decapsulates the packet to remove the header that carries the routes that were used to forward the packet through network 100 prior to transmitting the packet to its destination 160.

As shown in FIG. 1, the source 150 is connected to the network node C 120, and the destination 160 is connected to the network node E 120. Thus, the network node C 120 is an ingress node and the network node E 120 is an egress node of the network 100 for the pair of source 150 and destination 160, which may or may not be directly connected to the same network 100. The network controller 110 configures the network node C 120 with a route 132 (shown as solid arrows) for forwarding packets between the source 150 and the destination 160, denoted as <S, D>, where S identifies the source 150 and D identifies the destination 160. The network controller assigns the route 132 by indicating the links 131 for each network node 132 (e.g., network node C, F, and G) along the route 132, for example, in a vector form of [1,4,3], where 1, 4, and 3 are local identifiers at the network nodes C, F, and G 120, respectively. In some embodiments, the route 132 may represent a source-routed tunnel, such as a MPLS tunnel.

When the network node C 120 receives a packet from the source 150 destined to the destination 160, the network node C 120 identifies the route [1,4,3] assigned by the network controller 110, for example, stored in a flow table. The network node C 120 encapsulates the packet with a list of links 131 to follow (e.g., [1,4,3]), where the links 131 are identified by the local identifiers at each network node 120. In some embodiments, the list of links 131 is formatted as a vector (e.g., [1,4,3]) that is stored in the packet header. As shown, the network node C 120 forwards the packet to the network node F 120 via the link 131 identified by the local identifier 1 (shown as 1'). Upon receiving the packet from the network node C 120, the network node F 120 forwards the packet to the network node G 120 according to the route information carried in the packet header via the link 131 identified by the local identifier 4 (shown as 4'). Upon receiving the packet from the network node F 120, the network node G 120 forwards the packet to the network node E 120 according to the route information carried in the packet header via the link 131 identified by the local identifier 3 (shown as 3'). Upon receiving the packet from the network node G 120, the network node E 120 may remove the header that carries the route information and forward the packet to the destination 160. It should be noted that in some embodiments, the links 131 and/or the network nodes 120 may be globally and/or locally assigned and the listing of connections may be a partial list or a loose list. In addition, the forwarding paths (e.g., route 132) may be computed by a path computation element (PCE) centrally located at a management entity or co-located at a network node 120 (e.g., at an ingress node) instead of by a controller 110.

Figure 2:
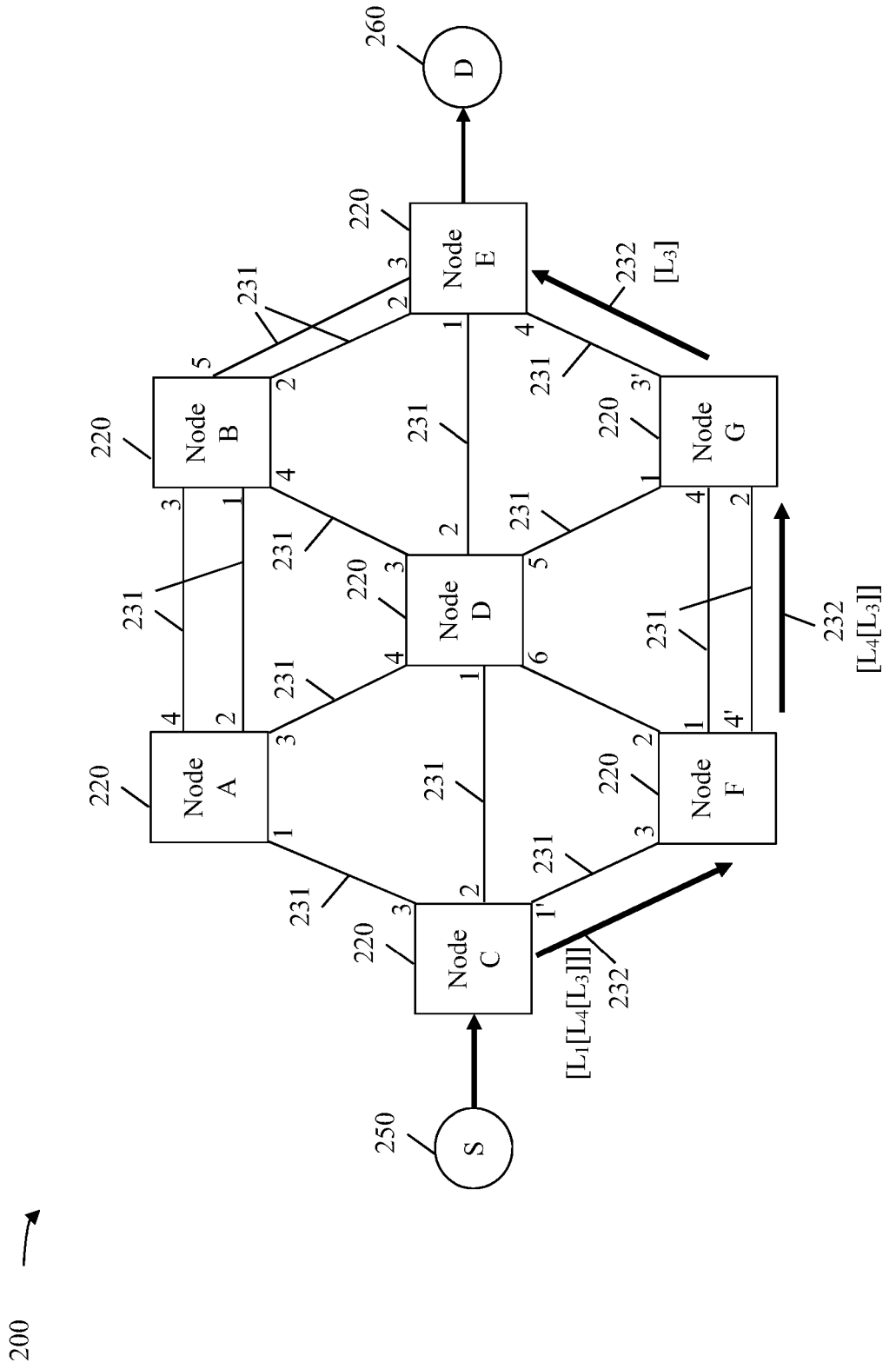
FIG. 2 is a schematic diagram of an embodiment of a segment routing network.

FIG. 2 is a schematic diagram of an embodiment of a segment routing network 200. The network 200 is similar to the network 100, but employs segment routing, for example, MPLS segment routing. The network 200 comprises a plurality of network nodes 220 (e.g. network nodes A-G) similar to the network nodes 120 interconnected by a plurality of links 231 similar to the links 131, where the network node C 220 is connected to a source 250 similar to the source 150 and the network node E 220 is connected to a destination 260 similar to the destination 160. The network 200 identifies routes by segment labels instead of a vector of local identifiers. As shown in FIG. 2, a segment label list of $[L_1, [L_4, [L_3]]]$ indicates a route 232 (shown as solid arrows) through the network nodes C, F, G, and E 220. For example, a network controller, such as the network controller 110, may configure the network node C 220 with the route $[L_1, [L_4, [L_3]]]$. When the network node C 220 receives a packet from the source 250, the network node C 220 encapsulates the packet with a header carrying the route information indicated by $[L_1, [L_4, [L_3]]]$ and forwards the packet to the network node F 220. Upon receiving the packet from the network node C 220, the network node F 220 extracts the route information from the packet header, performs a pop operation (e.g., by removing the link used to reach it, thus changing the route to $[L_4, [L_3]]$) to expose the next hop, and forwards the packet to the next hop, which is network node G 220. Upon receiving the packet from the network node F 220, the network node G 220 extracts the route information from the packet header, performs a pop operation to expose the next hop (e.g., $[L_3]$), and forwards the packet to the next hop, which is network node E 220. When the network node E 220 receives the packet, the network node E may remove the route information from the packet header and forward the packet to the destination 260.

Figure 3:
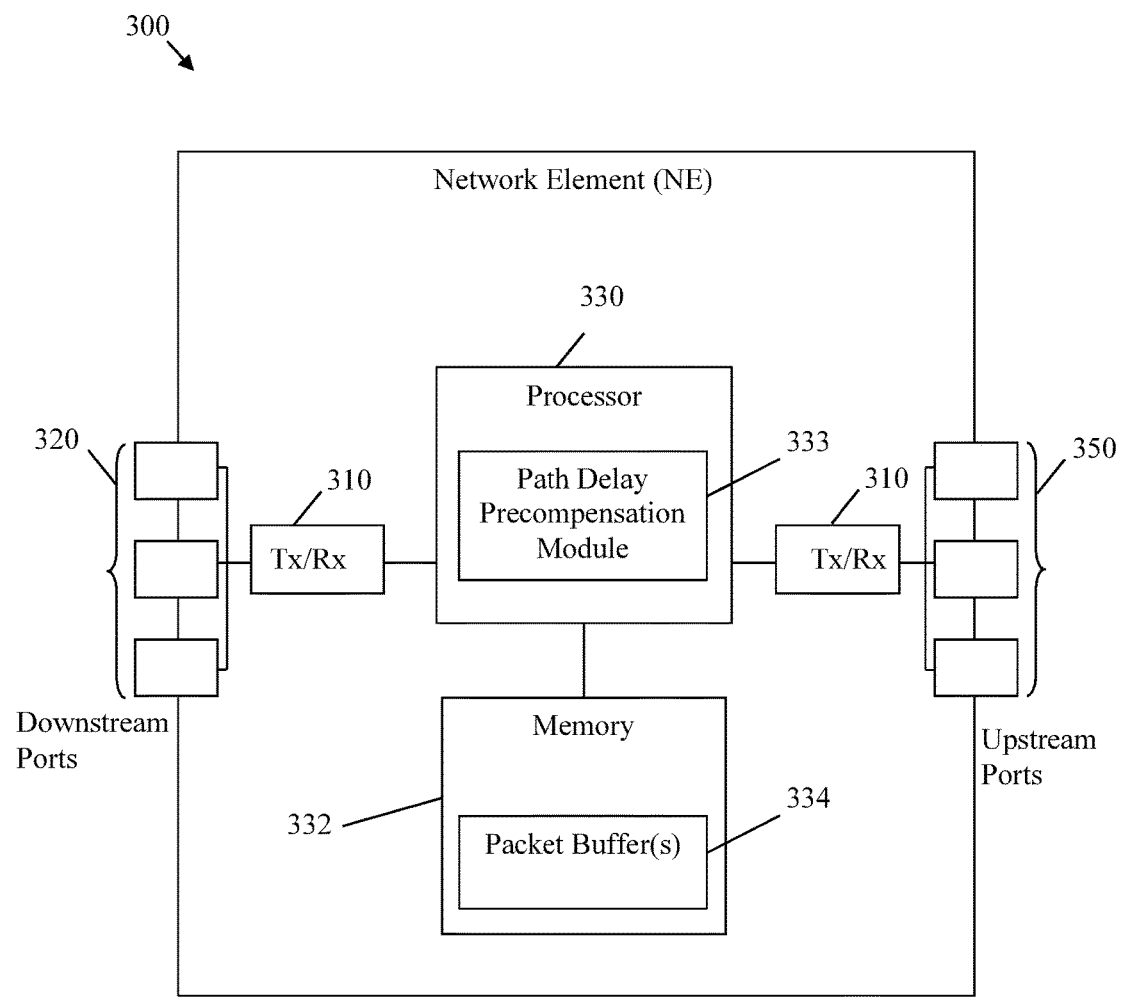
FIG. 3 is a schematic diagram of an embodiment of an NE, which may act as a node in a source routing network.

FIG. 3 is a schematic diagram of an embodiment of an NE 300. The NE 300 may act as a node, such as an ingress node, an egress node, a tandem node, a source, a destination, the network node 120, and/or the network controller 110, in a source routing network, such as the networks 100 and 200 and the networks 400, 500, and 1100 as discussed more fully below. The NE 300 may be configured to implement and/or support path delay precompensation during a source routing path change described herein. The NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 300. For instance, the features and/or methods in the disclosure may be implemented using hardware, firmware, and/or software installed to run on hardware. As shown in FIG. 3, the NE 300 may comprise transceivers (Tx/Rx) 310, which may be transmitters, receivers, or combinations thereof. A Tx/Rx 310 may be coupled to plurality of downstream ports 320 for transmitting and/or receiving frames from other nodes and a Tx/Rx 310 may be coupled to plurality of upstream ports 350 for transmitting and/or receiving frames from other nodes, respectively. It should be understood that upstream and downstream are logical directions specific to a routing scenario. The upstream and downstream ports need not be separate or served by separate transmit and receive circuitry 310. A processor 330 may be coupled to the Tx/Rx 310 to process the frames or packets and/or determine which nodes to send the frames to. The processor 330 may comprise one or more multi-core processors and/or memory devices 332, which may function as data stores, buffers, etc. The processor 330 may be implemented as a general processor or may be part of one or more application specific integrated circuits (ASICs) and/or digital signal processors (DSPs). The processor 330 may comprise a path delay precompensation module 333, which may implement methods 500, 600, 700, 800, 900, 1200, 1300, 1400, 1500, and 1600 as discussed more fully below, and/or any other mechanisms discussed herein. As such, the inclusion of the path delay precompensation module 333 and associated methods and systems provide improvements to the functionality of the NE 300. Further, the path delay precompensation module 333 effects a transformation of a particular article (e.g., the source routing network) to a different state (e.g., packet delays). In an alternative embodiment, the path delay precompensation module 333 may be implemented as instructions stored in the memory devices 332, which may be executed by the processor 330. The memory device 332 may comprise a cache for temporarily storing content, e.g., a random-access memory (RAM). Additionally, the memory device 332 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 332 may be configured to store one or more packet buffers 334 during a source routing path change, as discussed more fully below.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
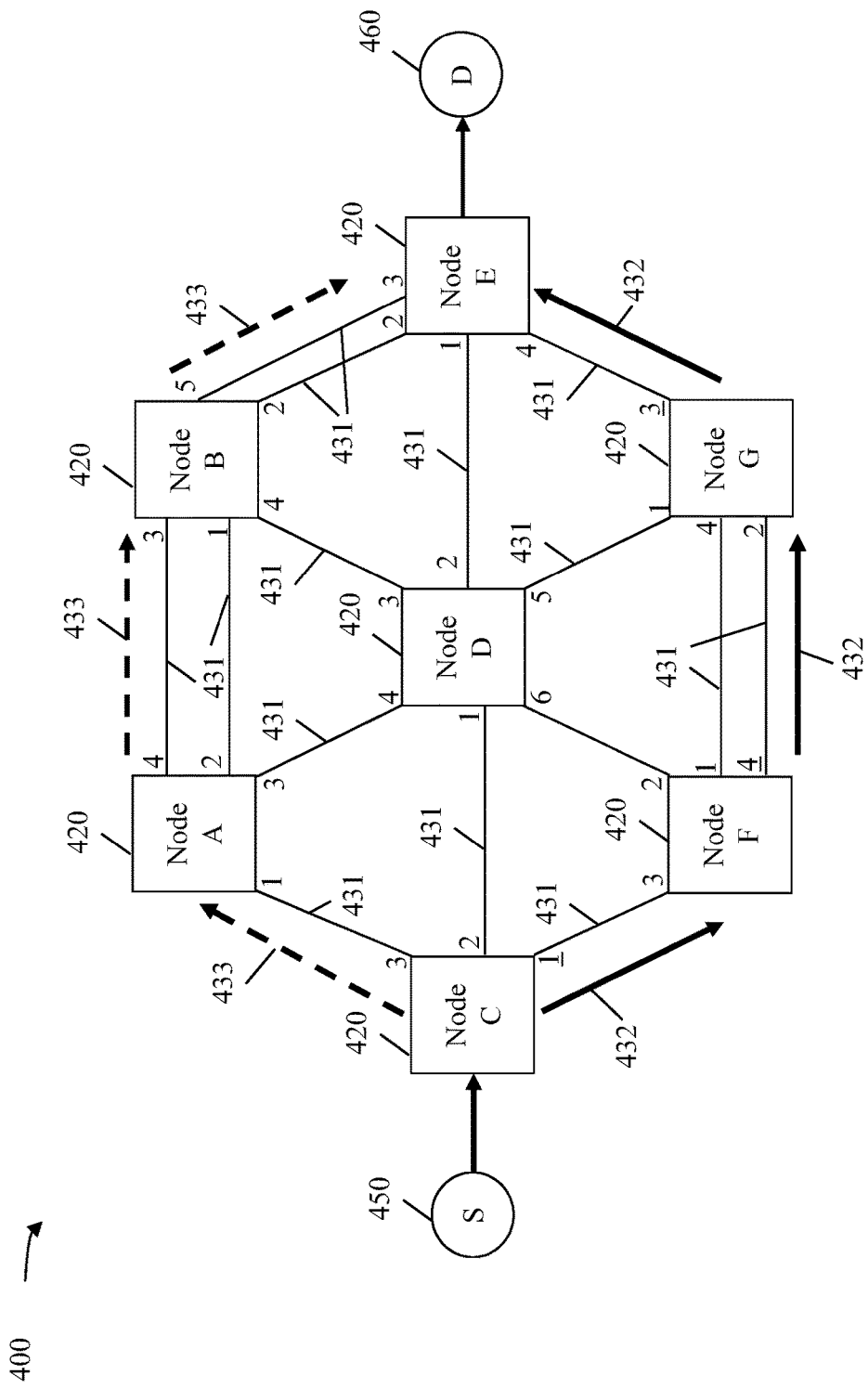
FIG. 4 illustrates an embodiment of a path change in a source routing network.

FIG. 4 illustrates an embodiment of a path change in a source routing network 400. The network 400 may be similar to the network 100 or 200. The network 400 comprises a plurality of network nodes 420 similar to the network nodes 120 interconnected by a plurality of links 431 similar to the links 231 and 131. As shown in the network 400, packets generated by a source 450 similar to the sources 150 and 250 are transported through the network 400 via an initial route 432 (shown as solid arrow) to reach a destination 460 similar to the destinations 160 and 260. The initial route 432 is similar to the routes 132, where the route information is represented by a local identifier list [1,4,3] and traverses through the network nodes C, F, G, and E 420. After some time, the network 400 configures an updated route 433 (shown as dashed arrow) for transporting packets between the source 450 and the destination 460, for example, due to optimizations, fault links, maintenances, changes in network conditions, etc. The updated route 433 is represented by a local identifier list [3,2,2] and traverses through the network nodes C, A, B, and E 420. The initial route 432 may be referred to as an initial path, denoted as $P_{old}$, and the updated route 433 may be referred to as an updated path, denoted as $P_{new}$. In some embodiments, the path change from the initial route 432 to the updated route 433 may be implemented at the network node C 420, which changes the routing information (e.g., in the header) from [1,4,3] to [3,2,2] when encapsulating packets that are received from the source 450 and destined to the destination 460.

Each transmission path, such as the initial route 432 and the updated route 433, includes a certain amount of delay due to factors such as signal propagation delays in the links 431 and/or delays in the network nodes 420. Some paths introduce more delay than other paths. For example, the delay through the initial route 432 is represented as delay($P_{old}$), and the delay through the updated route 433 is represented as delay($P_{new}$). When the updated route 433 comprises a greater path delay than the initial route 432 (e.g., delay($P_{new}$)>=delay($P_{old}$)), the path change from the initial route 432 to the updated route 433 may result in little to no impact to the end service and/or quality of service (QoS). For example, the end service may experience only slight jitter as a result of the reroute. However, when the initial route 422 has a greater path delay than the updated route 433 (e.g., delay($P_{old}$)>delay($P_{new}$)), the path change from the initial route 432 to the updated route 433 without any compensation can cause packets to arrive out of order at the destination 460.

Figure 5:
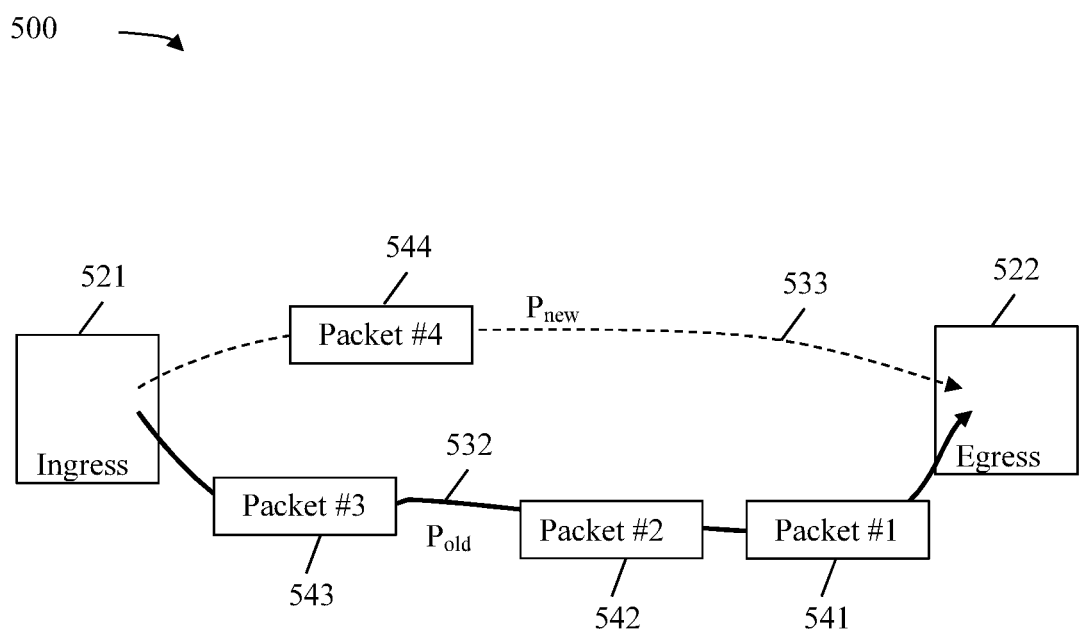
FIG. 5 illustrates an embodiment of a packet mis-ordering scenario in a source routing network during a path change.

FIG. 5 illustrates an embodiment of a packet mis-ordering scenario 500 in a source routing network, such as the networks 100, 200, and 400, during a path change. The network 500 may represent a portion of the network 100, 200, and 400. The network 500 comprises an ingress node 521 and an egress node 522 where the ingress node 521 and the egress node 522 are similar to the network nodes 120. For example, the ingress node 521 and the egress node 522 are similar to the network node C and E 420, respectively. As shown, the ingress node 521 sends a sequence of packets 541, 542, 543, and 544 associated with a packet flow towards the egress node 522, where the packets 541-543 are initially sent on an initial route 532, denoted as $P_{old}$, the packet 544 is sent on an updated route 533, denoted as $P_{new}$. The initial route 532 and the updated route 533 are similar to the routes 132, 232, 432, and 433 and may comprise one or more tandem nodes or network nodes, such as the network nodes 120, 220, and 420, between the ingress node 521 and the egress node 522. When the initial route 532 has a greater path delay than the updated route 533 (e.g., delay($P_{old}$)>delay($P_{new}$)), the packet 544 may arrive at the egress node 522 before the packet 543, thus causing packet mis-ordering in the packet flow or out-of-order packet delivery at a destination such as the destination 160, 260, and 460.

To resolve the mis-ordering of packets caused by a path change to an updated route (e.g., the updated route 533), $P_{new}$, that has a lower delay than $P_{old}$, an additional delay, dt, may be introduced at the updated route such that delay ($P_{new}$)+dt>=delay($P_{old}$). In an embodiment, the additional delay, dt, is computed as shown below:

$$dt \geq \text{delay}(P_{old}) - \text{delay}(P_{new}) \quad (1)$$

After applying the additional delay, dt to the packet flow along $P_{new}$, packet misordering will be mitigated or avoided.

In the absence of network congestion, the calculation of delay($P_{old}$), delay($P_{new}$), and dt is fairly deterministic. Most contributors to path delay (e.g., signal propagation delays, delays in the switches, etc.) may be estimated in advance to a suitable degree of accuracy. In one embodiment, the path delays may be obtained by employing a traffic engineering (TE) database. In another embodiment, the path delays may be obtained through path delay parameters during network discovery and/or included in some routing information. In yet another embodiment, the delays may be determined experimentally, for example, by sending pings down different paths. If dt<0 and is determined as the strict difference between delays, then delay($P_{new}$)>delay($P_{old}$), and there is low likelihood that packet misordering will result from the reroute. Alternatively, if dt>0, then an additional delay greater than or equal to dt is introduced into the updated route. FIGS. 6-9 illustrate various embodiments for introducing the additional delay in the updated route when dt>0.

Figure 6:
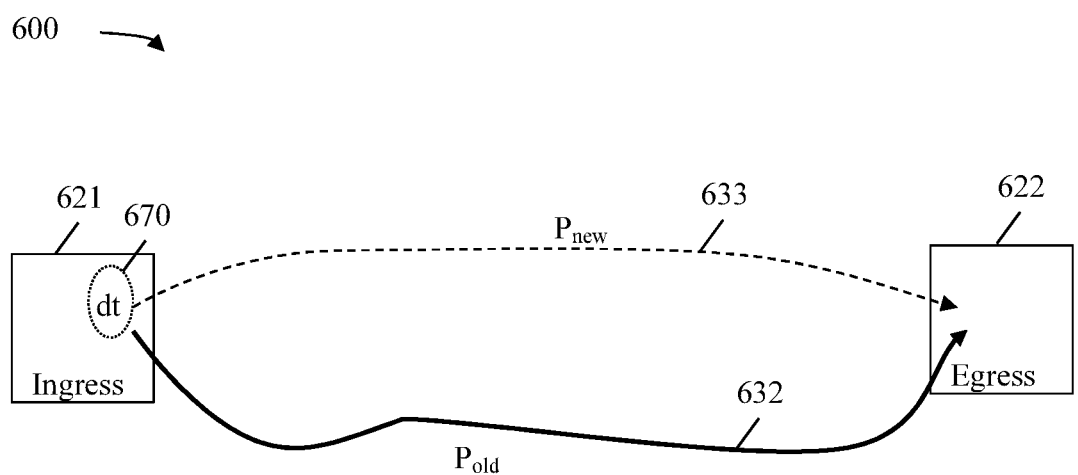
FIG. 6 is a schematic diagram illustrating an embodiment of a method for introducing an additional delay into a packet flow during a path change in a source routing network.

FIG. 6 is a schematic diagram illustrating an embodiment of a method 600 for introducing an additional delay 670, denoted as dt, into a packet flow during a path change in a source routing network, such as the networks 100, 200, 400, and 500. The packet flow may have originated from a source similar to the sources 150, 250, or 450 and may be addressed to a destination similar to the destinations 160, 260, and 460. In the method 600, an ingress node 621 (e.g., ingress node 521) forwards the packet flow towards an egress node 622 (e.g., egress node 522) along an initial route 632 (e.g., initial route 532), denoted as $P_{old}$. Ingress node 621 subsequently reroutes the packet flow to an updated route 633 (e.g., updated route 533) which has a shorter path delay, denoted as $P_{new}$. The additional delay 670 that must be added may be computed according to Equation (1). As shown, the method 600 introduces the additional delay 670 at the ingress node 621 so that packets transmitted along the initial route 632 reach the destination prior to packets transmitted along the updated route 633. In an embodiment, the ingress node 621 introduces the additional delay 670 by temporarily storing packets in one or more buffers such as the packet buffer 334, for example, located in a memory device such as the memory device 332, for a duration of the additional delay 670 before transmitting the packets along the updated route 633.

Figure 7:
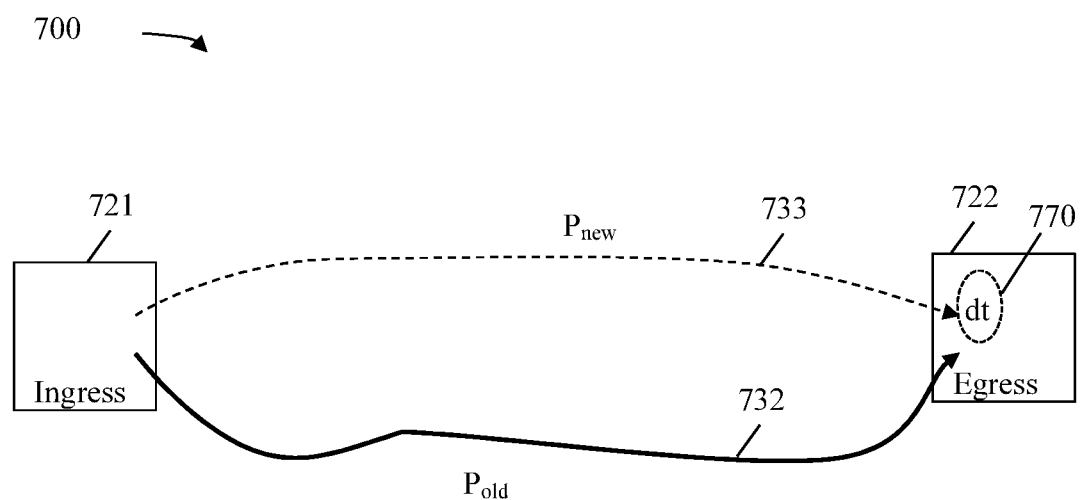
FIG. 7 is a schematic diagram illustrating another embodiment of a method for introducing an additional delay into a packet flow during a path change in a source routing network.

FIG. 7 is a schematic diagram illustrating an embodiment of a method 700 for introducing an additional delay 770, denoted as dt, into a packet flow during a path change in a source routing network, such as the network 100, 200, 400, and 500. The packet flow may have originated from a source similar to the sources 150, 250, or 450 and may be addressed to a destination similar to the destinations 160, 260, and 460. The method 700 is substantially similar to the method 600, but introduces the additional delay 770 at an egress node 722 (e.g., egress nodes 522 and 622) instead of at an ingress node 721 (e.g., ingress nodes 521 and 621) as in the method 600.

In the method 700, the ingress node 721 forwards the packet flow towards the egress node 722 along an initial route 732 (e.g., initial routes 531 and 631), denoted as $P_{old}$, and subsequently reroute the packet flow to an updated route 733 (e.g., updated routes 533 and 633), denoted as $P_{new}$ and having a shorter path delay. The additional delay 770 is computed according to Equation (1). As shown, the method 700 introduces the additional delay 770 at the egress node 722 so that packets transmitted along the initial route 732 may reach the destination prior to packets transmitted along the updated route 733. In an embodiment, the egress node 722 introduces the additional delay 770 by temporarily storing packets received over path 733 in one or more buffers such as the packet buffer 334, for example, located in a memory device such as the memory device 332, for a duration of the additional delay 770 before transmitting the packets to the destination, such as the destination 160, 260, and 460.

Figure 8:
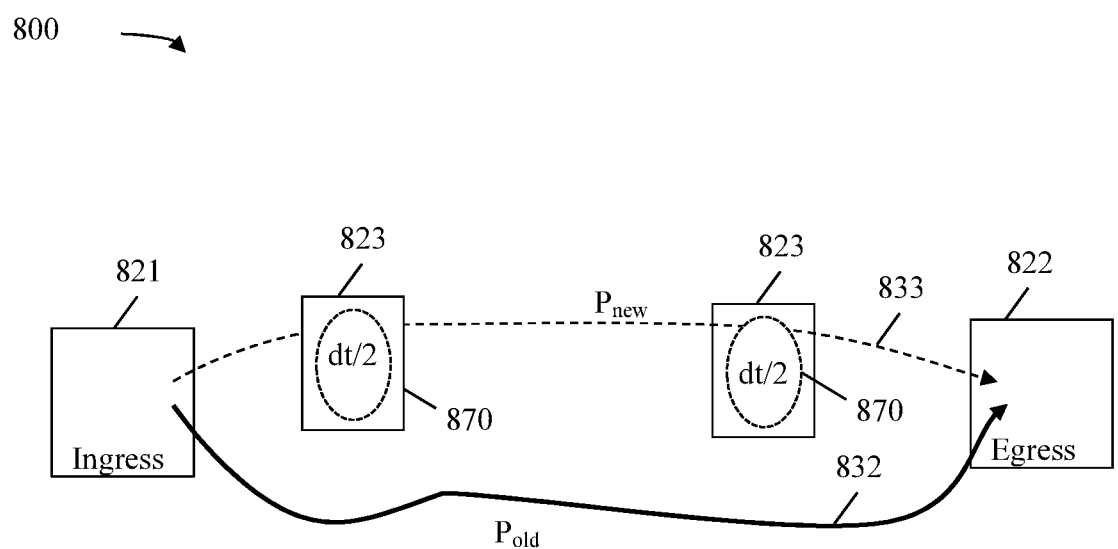
FIG. 8 is a schematic diagram illustrating another embodiment of a method for introducing an additional delay into a packet flow during a path change in a source routing network.

FIG. 8 is a schematic diagram illustrating an embodiment of a method 800 for introducing an additional delay, denoted as dt, into a packet flow during a path change in a source routing network, such as the network 100, 200, 400, and 500. The packet flow may have originated from a source similar to the sources 150, 250, or 450 and may be addressed to a destination similar to the destinations 160, 260, and 460. The method 800 is substantially similar to the methods 600 and 700, but distributes the additional delay, dt, among a plurality of intermediates nodes 823 instead of at an ingress node 821 (e.g., ingress nodes 521, 621, and 721) as in the method 600 or at an egress node 822 (e.g., egress nodes 522, 622, and 722) as in the method 700. The intermediate (or tandem) nodes 823 are positioned between the ingress node 821 and the egress node 822 along the updated route 833 and may be similar to the network nodes A and B 120, 220, and 420 or the network nodes F and G 120, 220 and 420. In the method 800, the ingress node 821 forwards the packet flow towards the egress node 822 along an initial route 832 (e.g., initial route 532, 632, and 732), denoted as $P_{old}$, and subsequently reroutes the packet flow to an updated route 833 (e.g., updated routes 533, 633, and 733), denoted as $P_{new}$. The additional delay, dt, is computed according to Equation (1). As shown, the method 800 distributes the additional delay, dt, among a plurality of intermediate nodes 823 such that packets transmitted along the initial route 832 may reach the destination prior to packets transmitted along the updated route 833. For example, the additional delay, dt, may be distributed among the plurality of intermediate nodes 823 by dividing the additional delay into multiple delay parts 870 (e.g., two parts of dt/2) and introducing one delay part 870 at each intermediate node 823. In an embodiment, each intermediate node 823 temporarily stores packets in one or more buffers such as the packet buffer 334, for example, located in a memory device such as the memory device 332, for a duration of the delay part 870 before forwarding the packet to a next hop node (e.g., as indicated in the packet header).

It should be noted that the distribution of the additional delay, dt, over the multiple intermediate nodes 823 spreads the additional buffer space and/or memory usage requirements over the multiple intermediate nodes 823 instead of burdening a single. In addition, different methods may be employed to divide the additional delay, dt, into the multiple delay parts 870, which may be equal delay parts (e.g., two parts of dt/2) or unequal delay parts (e.g., one part of dt/3 and one part of 2dt/3). Further, the additional delay, dt, may be spread among any number of nodes along the updated route 833 between the ingress node 821 and the egress node 822, for example, at one or more intermediate nodes 823, the ingress node 821, and/or the egress node 822. In order to determine a suitable delay at a particular node, the node's buffer memory and the amount of traffic carried through the node may be considered. For example, a node with more memory or less traffic may be more suitable for absorbing a delay than a node with comparatively less memory or more traffic.

Figure 9:
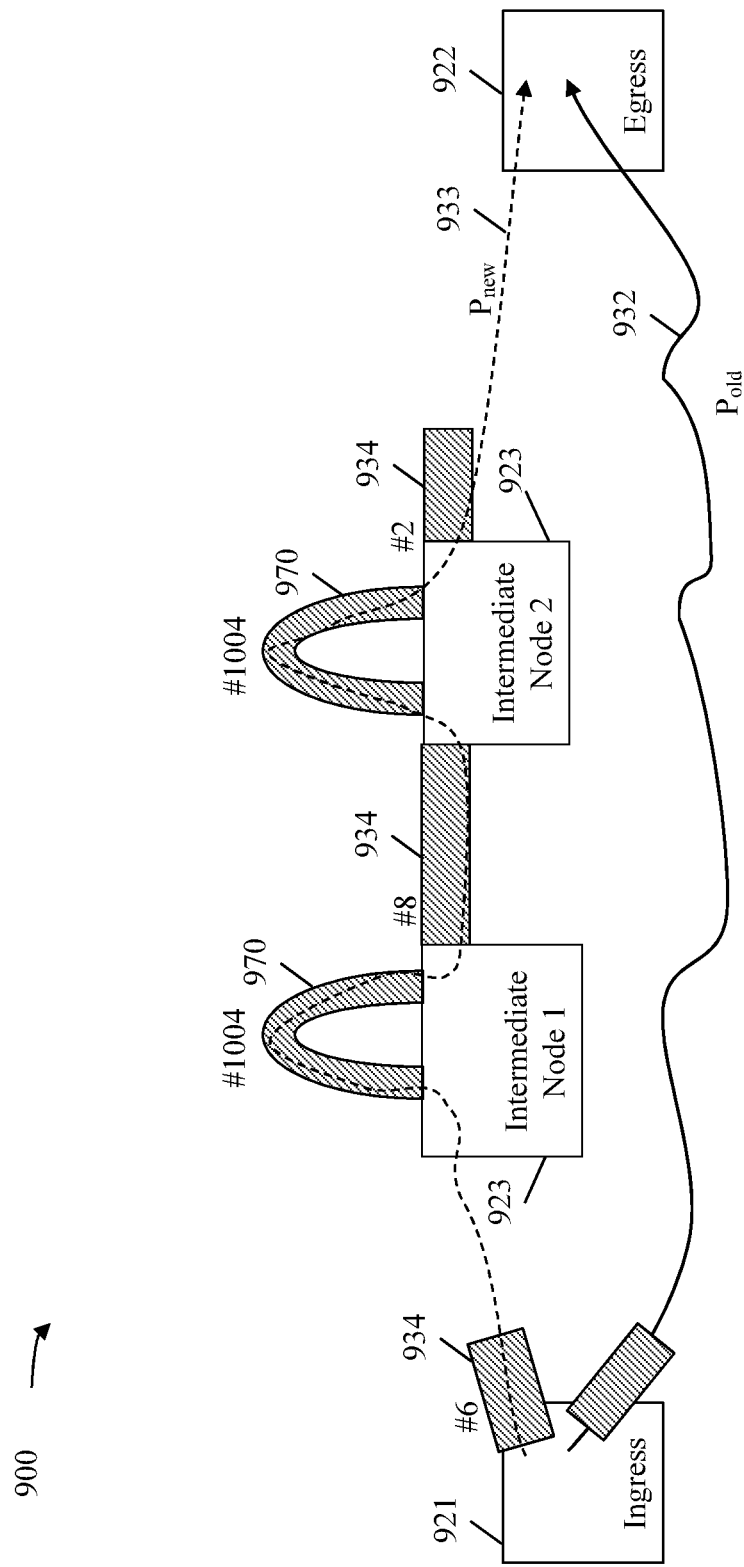
FIG. 9 is a schematic diagram illustrating another embodiment of a method for introducing an additional delay into a packet flow during a path change in a source routing network.

FIG. 9 is a schematic diagram illustrating an embodiment of a method 900 for introducing an additional delay, denoted as dt, into a packet flow during a path change in a source routing network, such as the network 100, 200, 400, and 500. The packet flow may have originated from a source similar to the sources 150, 250, or 450 and may be addressed to a destination similar to the destinations 160, 260, and 460. The method 900 is substantially similar to the method 800, but distributes the additional delay, dt, among a plurality of intermediates nodes 923 (e.g., intermediate nodes 823) by employing logical variable delay segments 970. In the method 900, an ingress node 921 forwards the packet flow towards an egress node 922 along an initial route 932 (e.g., initial route 532, 632, 732, and 832), denoted as $P_{old}$, and subsequently reroute the packet flow to an updated route 933 (e.g., updated routes 533, 633, 733, and 833), denoted as $P_{new}$ having a shorter path delay. The additional delay, dt, is computed according to Equation (1). As shown, the method 900 inserts logical variable delay segments 970 at the intermediate nodes 923 to create delays at the intermediate nodes so that packets transmitted along the initial route 932 may reach the destination prior to packets transmitted along the updated route 933. For example, the logical variable delay segments 970 may create delays by logically looping packets back at the intermediate nodes 923. Although the physical path is unchanged, some nodes may effectively forward packets to themselves to create delay segments 970.

In an embodiment, the source routing network may be an MPLS network. In such an embodiment, the updated route 933 may be divided into multiple segments 934. Each segment 934 is identified by a segment identifier (ID) (e.g., #6, #8, and #2). In some embodiments, a segment ID directly controls the amount of delays in a logical variable delay segment 970. For example, each segment ID may correspond to a fixed amount of delay, a range of delays, or any other pre-determined mappings between segment IDs and delays. The list of segments 934 may be carried in a header of a packet traversing the updated route 933. In such an embodiment, when rerouting a packet flow from the initial route 932 (e.g., a high-delay route) to the updated route 933 (e.g., a low-delay route), an additional delay, dt, (e.g., computed according to Equation (1)) may be introduced in the updated route 933 by adding one or more logical variable delay segments 970 (e.g., with equal or unequal delays) at one or more of the intermediate nodes 923. For example, when a logical variable delay segment 970 is included at an intermediate node 923, the intermediate node 923 triggers a fixed amount of delay based on the segment ID and imparts that amount of delay to a packet before forwarding the packet according to the remainder of the source route. It should be noted that any number of logical variable delay segments 970 with the same segment ID or different segment IDs may be added at a single node and/or multiple nodes. For example, the segment list for the updated route 933 may be represented in the form of [#6, . . . , #1004, #8, #1004, #2, . . . ], where #1004 represents the segment ID for a logical variable delay segment 970.

Figure 10:
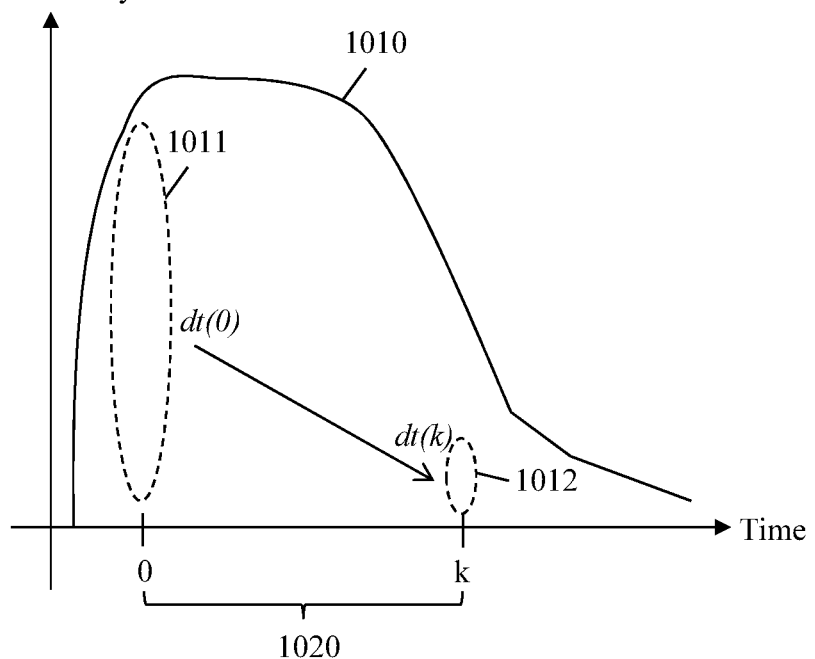
FIG. 10 is a graph illustrating an embodiment of a path delay injection scheme.

FIG. 10 is a graph 1000 illustrating an embodiment of a path delay injection scheme. In FIG. 10, the x-axis represents time in some arbitrary constant time units, and the y-axis represents path delays in some arbitrary constant time units. The delay scheme may be employed by the methods 600, 700, 800, and 900 during a path change to gradually reduce an amount of additional delay, such as the additional delays 670 and 770, the delay parts 870, and delays from the logical variable delay segments 970. The plot 1010 represents the amount of additional delays that may be introduced into a current source routing path, such as the updated routes 533, 633, 733, 833, and 933, over a period of time, where the current source routing path has a lower delay than a previous source routing path prior to a path change. For example, an initial additional delay 1011, denoted as dt(0), may be applied to the current source routing path when the path change first occurs and after a duration 1020, a lower additional delay 1012 may be applied to the source routing path. The additional delay may eventually be reduced to a value of zero or removed from the source routing path, for example, after all the packets transmitted along the previous source routing path have been successfully transmitted to a destination, such as the destinations 160, 260, and 460, or after a full cycle of the initial additional delay 1011. It should be noted that the rate at which the amount of additional delays is reduced may vary depending on various factors, such as the amount of path delay difference between the current source routing path and the previous source routing paths, traffic patterns, and/or network. For example, the amount of additional delays may be decayed at a logarithmic rate, a geometric rate, or at a linear rate. In addition, when the delay is distributed among multiple nodes, the delay at different nodes may be reduced at different rates.

Figure 11:
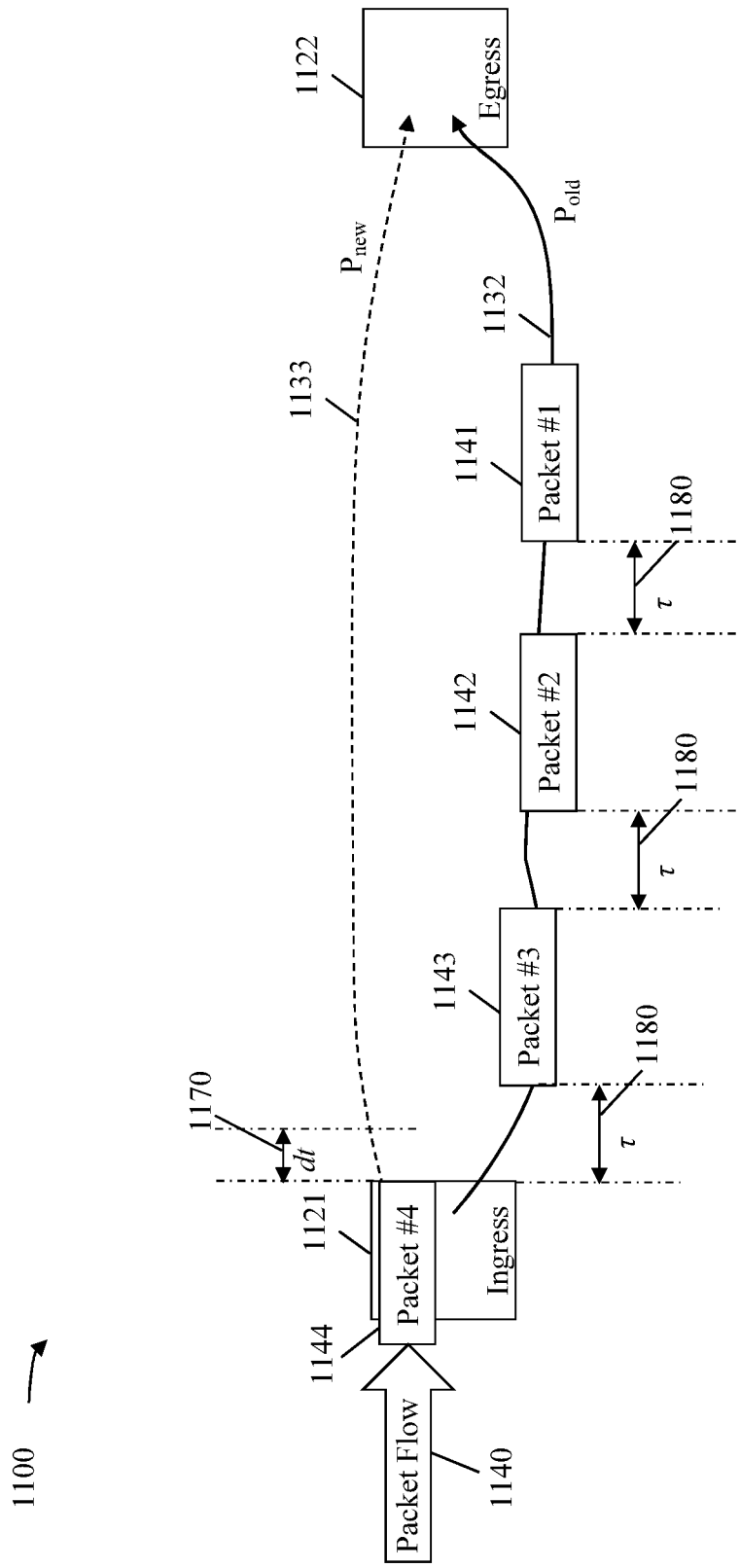
FIG. 11 is a schematic diagram of an embodiment of a packet flow comprising inter-packet delays in a source routing network.

FIG. 11 is a schematic diagram illustrating an embodiment of a packet flow 1140 comprising inter-packet delays 1180, denoted as $\tau$, in a source routing network 1100. The network 1100 is similar to the network 500 and may represent a portion of the networks 100, 200, and 400. The network 1100 illustrates mechanisms for utilizing the inter-packet delays 1180 in the packet flow 1140 to reduce the amount of additional delay 1170, denoted as dt, such as the additional delays 670 and 770, delay parts 870, and delays created by the logical variable delay segments 970 corresponding to the delay difference between an initial route (e.g., initial routes 632, 732, 832, and 932) and an updated route (e.g., updated routes 633, 733, 833, and 933), that may be applied during a path change. The network 1100 comprises an ingress node 1121 and an egress node 1122 interconnected via an initial route 1132, denoted as $P_{old}$, and an updated route 1133, denoted as $P_{new}$. The ingress node 1121 is similar to the network node C 120, 220, and 420, and the ingress nodes 521, 621, 721, 821, and 921. The egress node 1122 is similar to the network node E 120, 220, and 420, and the egress nodes 522, 622, 722, 822, and 922. The initial route 1132 is similar to the initial routes 532, 632, 732, 832, and 932. The updated route 1133 is similar to the updated routes 533, 633, 733, 833, and 933. The ingress node 1121 is configured to direct a packet flow 1140 comprising a plurality of packets 1141, 1142, 1143, and 1144 towards the egress node 1122. The packet flow 1140 may have originated from a source similar to the sources 150, 250, and 450 and may be addressed to a destination similar to the destinations 160, 260, and 460. The inter-packet delays 1180 between successive packets in the packet flow 1140 may be dependent on the rate (e.g., packet generation rate) at which the source generates the packets 1141-1144. As shown, the ingress node 1121 forwards the packets 1141-1143 along the initial route 1132 and subsequently forwards the packet 1144 along the updated route 1133. By observing the inter-packet delays 1180, if the path delay difference between the initial route 1132 and the updated route 1133 is less than the inter-packet delay 1180 (e.g., time gap between packets 1143 and 1144), then the packet 1144 may be transmitted along the updated route 1133 without adding the additional delay 1170 as described earlier since the inter-packet delay 1180 provides a sufficient amount of delay to make up for the path delay difference. However, if the path delay difference is greater than the inter-packet delay 1180, then an additional delay 1170 may be applied to the packet 1144. For example, the packet 1144 may be delayed by an amount at least equal to a time difference between the path delay difference and the inter-packet delay 1180 so that the packet 1144 may reach the destination after the packet 1143. Thus, instead of computing the additional delay 1170 as shown in Equation (1), the additional delay 1170 may be reduced by the inter-packet delay 1180 and computed as shown below:

$$dt = \text{delay}(P_{old}) - \text{delay}(P_{new}) - \tau + \varepsilon, \qquad (2)$$

where $\varepsilon$ is a value that is greater than zero, but significantly smaller than $\tau$ so that it does not cancel out the desired effect provided by $\tau$. For example, $\varepsilon$ may be set to a minimal positive value such that the packet 1144 may arrive at the egress node 1122 just after the packet 1143 instead of at the same time.

As an example, the ingress nodes 1121 may transmit the packet 1141 along the initial route 1132 at a time T1. Then, the packets 1142 and 1143 may be transmitted at time T1+$\tau$ and T1+2$\tau$, respectively. Thus, the packets 1141, 1142, and 1143 may reach the egress node 1122 at time T1+delay ($P_{old}$), T1+delay ($P_{old}$)+$\tau$, and T1+delay ($P_{old}$)+2$\tau$, respectively. When the ingress node 1121 switches over to the updated route 1133, the ingress node 1121 may delay the transmission of the packet 1144 by a duration of the additional delay 1170. Thus, the packet 1144 may be transmitted at time T1+3$\tau$+dt and may reach the egress node 1122 at time T1+delay ($P_{new}$)+3$\tau$+dt. The transmit (Tx) times at the ingress node 1121 and the receive (Rx) times at the egress node 1122 for the packets 1141-1144 are summarized below in Table 1.

TABLE 1

Tx Times and Rx Times for Packets 1141-1144

| | Tx Time (at ingress node 1121) | Rx Time (at egress node 1122) |
|---|---|---|
| Packet 1141 | T1 | T1 + delay ($P_{old}$) |
| Packet 1142 | T1 + $\tau$ | T1 + delay ($P_{old}$) + $\tau$ |
| Packet 1143 | T1 + 2$\tau$ | T1 + delay ($P_{old}$) + 2$\tau$ |
| Packet 1144 | T1 + 3$\tau$ + dt | T1 + delay ($P_{new}$) + 3$\tau$ + dt |

By observing the Rx times of the packets 1143 and 1144, it is evident that the additional delay, dt, may be computed as shown in Equation (2). As such, by utilizing the inter-packet delays 1180, the amount of additional delay 1170 may be applied according to Equation (3) as shown below:

$$\begin{cases} dt = \text{delay}(P_{old}) - \text{delay}(P_{new}) - \tau + \varepsilon, & \text{if } \text{delay}(P_{old}) - \text{delay}(P_{new}) > \tau, \\ dt = 0, & \text{if } \text{delay}(P_{old}) - \text{delay}(P_{new}) \leq \tau, \end{cases} \qquad (3)$$

where $\varepsilon$ is a minimal delay offset value fractionally greater than zero as describe above.

It should be noted that the additional delay 1170 may be introduced into the updated route 1133 by employing substantially similar mechanisms as described in the methods 600, 700, 800, and/or 900 and may be removed from the updated route 1133 after the packets 1141-1143 reach the egress node 1122. In addition, the additional delay 1170 may be removed by gradually reducing the additional delay 1170 over a period of time by employing a delay scheme similar to the delay scheme shown in the graph 1000.

Figure 12:
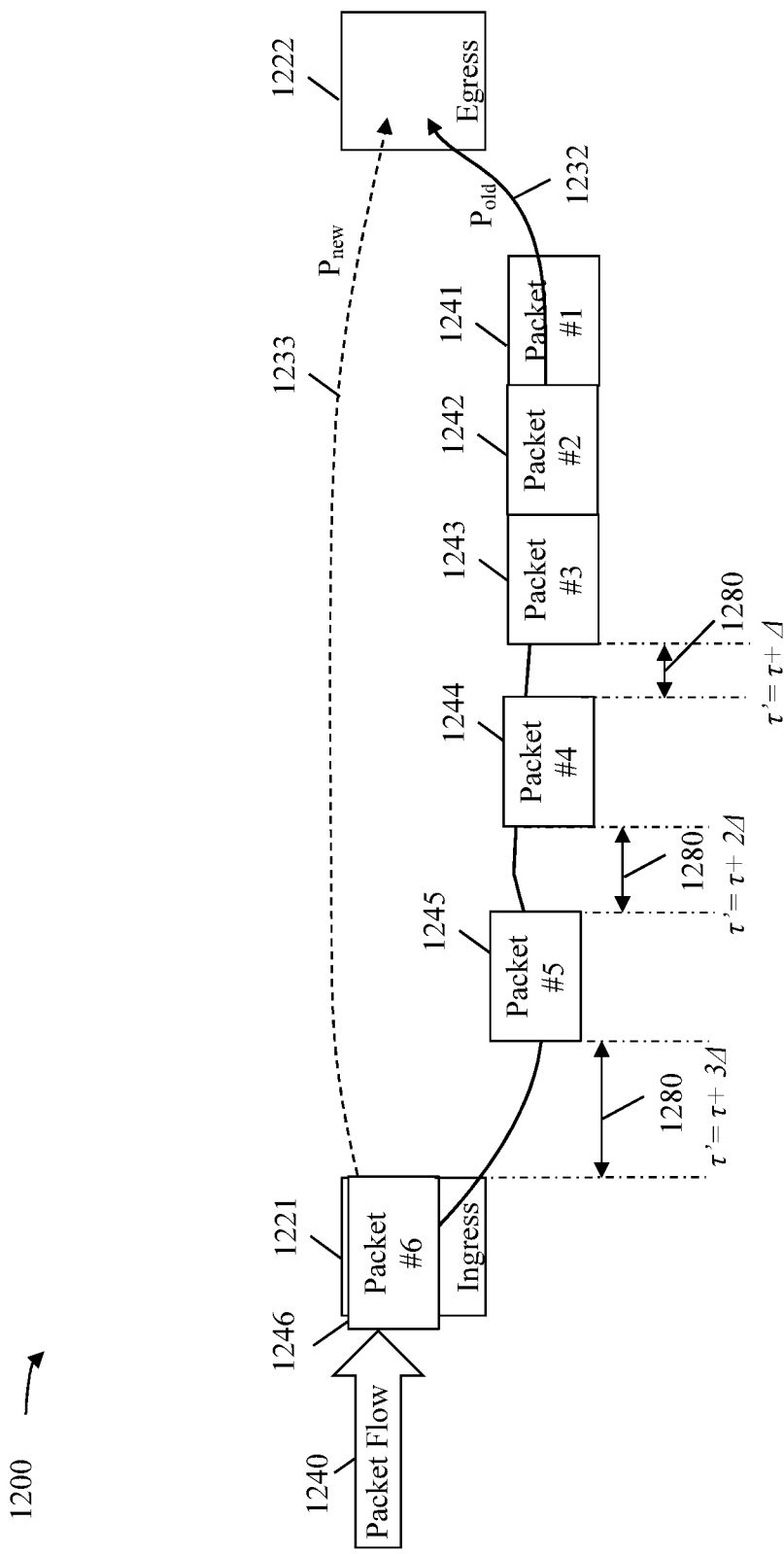
FIG. 12 is a schematic diagram illustrating an embodiment of a method for transitioning packet delays when rerouting a packet flow in a source routing network.

FIG. 12 is a schematic diagram illustrating an embodiment of a method 1200 for transitioning packet delays when rerouting a packet flow 1240 in a source routing network, such as the networks 100, 200, 400, 500, and 1100. The packet flow 1240 may have originated from a source similar to the sources 150, 250, or 450 and may be addressed to a destination similar to the destinations 160, 260, and 460. The packet flow 1240 comprises a steady stream of packets 1241, 1242, 1243, 1244, 1245, and 1246, where the packet flow 1240 comprises an original inter-packet delay, denoted as τ, that is about zero. For example, there is no gap between the packets 1241-1243. In the method 1200, an ingress node 1221 (e.g., ingress nodes 521, 621, 721, 821, 921, and 1121) initially forwards the packet flow (e.g., packets 1241-1245) towards an egress node 1222 (e.g., egress nodes 522, 622, 722, 822, 922, and 1122) along an initial route 1232 (e.g., initial routes 532, 632,732, 832, 732, 832, 932, and 1132), denoted as $P_{old}$, and subsequently performs a path switch to forward the packet flow 1240 (e.g., packet 1246) along an updated route 1233 (e.g., updated routes 533, 633, 733, 833, 933, and 1133), denoted as $P_{new}$. For example, the initial route 1232 comprises a greater path delay than the updated route 1233, where the path delay difference between the initial route 1232 and the updated route 1233 is greater than zero (e.g., delay($P_{old}$)−delay($P_{new}$)>0). Since the original inter-packet delay, τ, is about zero, the additional delay, dt, computed according Equations (2) and (3) is about equal to the path delay difference. Thus, the opportunity to reduce the additional delay, dt, by utilizing the original inter-packet delay, τ, diminishes. For example, the opportunity to reduce the additional delay dt, decreases as the inter-packet delay, τ, approaches a value of zero (e.g., $\lim_{\tau \to 0}$ (Applied delay)=0).

Introducing the full amount of additional delay, dt, after the packet flow 1240 switches to the updated route 1233 may be difficult or expensive for some systems, for example, due to memory and buffers limitations, and may cause delay jitters. The method 1200 may build up at least a portion of the additional delay, dt, over a number of nodes along the initial route 1232 prior to the path change. To provide a smooth delay transition, the method 1200 progressively increases the inter-packet delays 1280, denoted as τ', between at least some successive packets (e.g., packets 1243-1245) along the initial route 1232. For example, the ingress node 1221 introduces an increasing amount of delays, denoted as n×Δ, where n is a packet counter and Δ is an incremental additional delay, between the successive packets. The method 1200 builds a desired amount of delay along the initial route 1232 based on buffer limitations at the ingress node 1221. As an example, when the path delay difference is about 7 microseconds (μs) and the ingress node 1221 comprises a buffer space sufficient for buffering about 4 μs of data packets, the method 1200 may be employed to build up the inter-packet delay such that the inter-packet delay 1280 between the packets 1245 and 1246 is about 3 μs. When switching to the updated route 1233, the 4 μs of buffer space available at the ingress node 1221 enable the ingress node 1221 to introduce the remaining 4 μs of delay along the updated route 1233. Thus, the creation of the 3 μs delay along the initial route 1232 and the introduction of the 4 μs delay along the updated route 1233 provide the 7 μs of delay required for rerouting without packet mis-ordering. It should be noted that in some embodiments, the additional delay, dt, may be introduced into the packet flow 1240 by combining mechanisms described in the methods 600, 700, 800, 900, 1100, and 1200. For example, the additional delay, dt, may be divided into two portions, where one portion may be introduced into the initial route 1232 and another portion may be introduced into the update route 1233.

Figure 13:
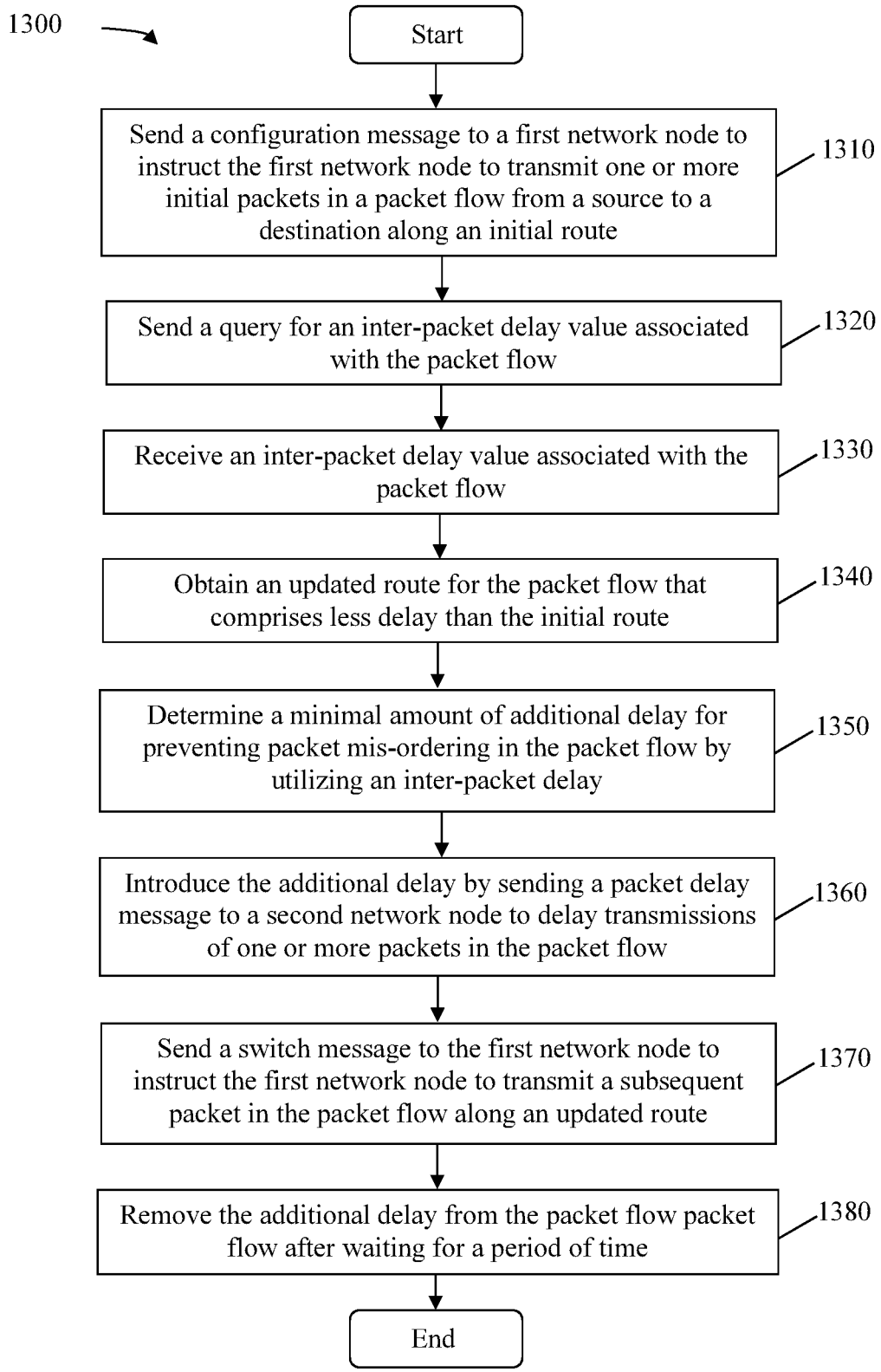
FIG. 13 is a flowchart of an embodiment of a method for adding a minimal amount of additional delay when rerouting a packet flow in a source routing.

FIG. 13 is a flowchart of an embodiment of a method 1300 for adding a minimal amount of additional delay when rerouting a packet flow in a source routing network. The packet flow is similar to the packet flows 1140 and 1240, and the network is similar to the networks 100, 200, 400, 500, and 1100. The method 1300 is implemented by a network node, such as the network controller 110. The method 1300 instructs network nodes, such as the ingress nodes 521, 621, 721, 821, 921, 1121, and 1221, the intermediate nodes 823 and 923, and egress nodes 522, 622, 722, 822, 922, and 1222 to employ substantially similar mechanisms as described in the methods 600, 700, 800, 900, 1100, and 1200. The method 1300 is implemented when the network controller reroutes the packet flow from an initial route to an updated route that comprises less path delay than the initial route. The initial route is similar to the initial routes 432, 532, 632, 732, 832, 932, 1132, and 1232, and the updated route is similar to the updated routes 433, 533, 633, 733, 833, 933, 1133, and 1233. At step 1310, a configuration message is sent to a first network node, which may be ingress node such as the ingress nodes 521, 621, 721, 821, 921, 1121, and 1221, to instruct the first network node to transmit one or more initial packets, such as the packets 541-543, 1141-1143 or 1241-1245, in the packet flow from a source, such as the source 150, 250, and 450, to a destination, such as the destination 160, 260, and 460, along an initial route. For example, the initial route comprises an initial path delay, which may be caused by signal propagation over links such as the links 131, 232, and 431 and/or network nodes such as the network nodes 120, 220, and 420 and the intermediate nodes 823 and 923.

At step 1320, a query for an inter-packet delay value associated with the packet flow is sent. At step 1330, an inter-packet delay value associated with the packet flow is received. The inter-packet delay may be associated with a packet generation rate at the source. For example, the query is sent to an ingress node and the ingress node of the network monitors the packet flow to determine the inter-packet delay and respond to the query. In an embodiment of a streaming application, the inter-packet delays between successive packets may be about constant.

At step 1340, an updated route having less delay than the initial route is obtained. For example, the network controller may coordinate with a PCE to obtain the updated route. At step 1350, a minimal amount of additional delay is determined for preventing packet mis-ordering in the packet flow when switching to the updated route by utilizing the inter-packet delay. For example, the additional delay is determined by subtracting an updated path delay of the updated route and the inter-packet delay from an initial path delay of the initial route and adding a delay offset value ε as shown in Equation (2). In some embodiments, the updated path delay and the initial path delay may be obtained from the PCE. At step 1360, the additional delay is introduced into the packet flow by sending a packet delay message to a second network node to delay transmissions of one or more packets in the packet flow. The second network node may be an ingress node, an egress node such as the egress nodes 522, 622, 722, 822, 922, 1122, and 1222, or an intermediate node such as the intermediate nodes 823 and 923. The additional delay is introduced into the packet flow when the interpacket delay is less than the path delay difference (e.g., according to Equation (3)). The additional delay may be introduced along the initial route (e.g., as described in the method 1200), the updated route (e.g., as described in the method 1100), or combinations thereof depending on the amount of inter-packet delay, the amount of the additional delay, and the buffer size at the ingress node, for example, by employing methods 1500 and/or 1600, as discussed more fully below. The network controller may instruct the second network node to employ substantially similar mechanisms as described in the methods 600, 700, 800, and 900 to delay the transmission of the subsequent packet.

At step 1370, a switch message is sent to the first network node to instruct the first network node to transmit a subsequent packet in the packet flow along the updated route. At step 1380, the additional delay is removed from the packet flow after waiting a period of time subsequent to switching from the initial route to the updated route. For example, the network controller may instruct an ingress node, an egress node, and/or intermediate nodes that were previously instructed to delay the transmission of the subsequent packet to stop delaying transmissions of subsequent packets along the updated route. The period of wait time may be about one full cycle of the additional delay. In some embodiments, additional delay may be removed by decaying the additional delay over a period of time by employing a delay scheme similar to the delay scheme described in the graph 1000.

It should be noted that the inter-packet delay query at step 1320 and the reception of the inter-packet delay at step 1330 may be optional, and thus the additional delay determined at step 1350 may be the path delay difference between the initial route and the updated route. In addition, when the network controller determines to introduce a delay at the ingress node, the network controller may include delay instructions in the switch message instead of a separate packet delay message (e.g., by combining steps 1350 and 1360). Further, the method 1300 may be performed in the order as shown or any other suitable order as determined by a person of ordinary skill in the art.

Figure 14:
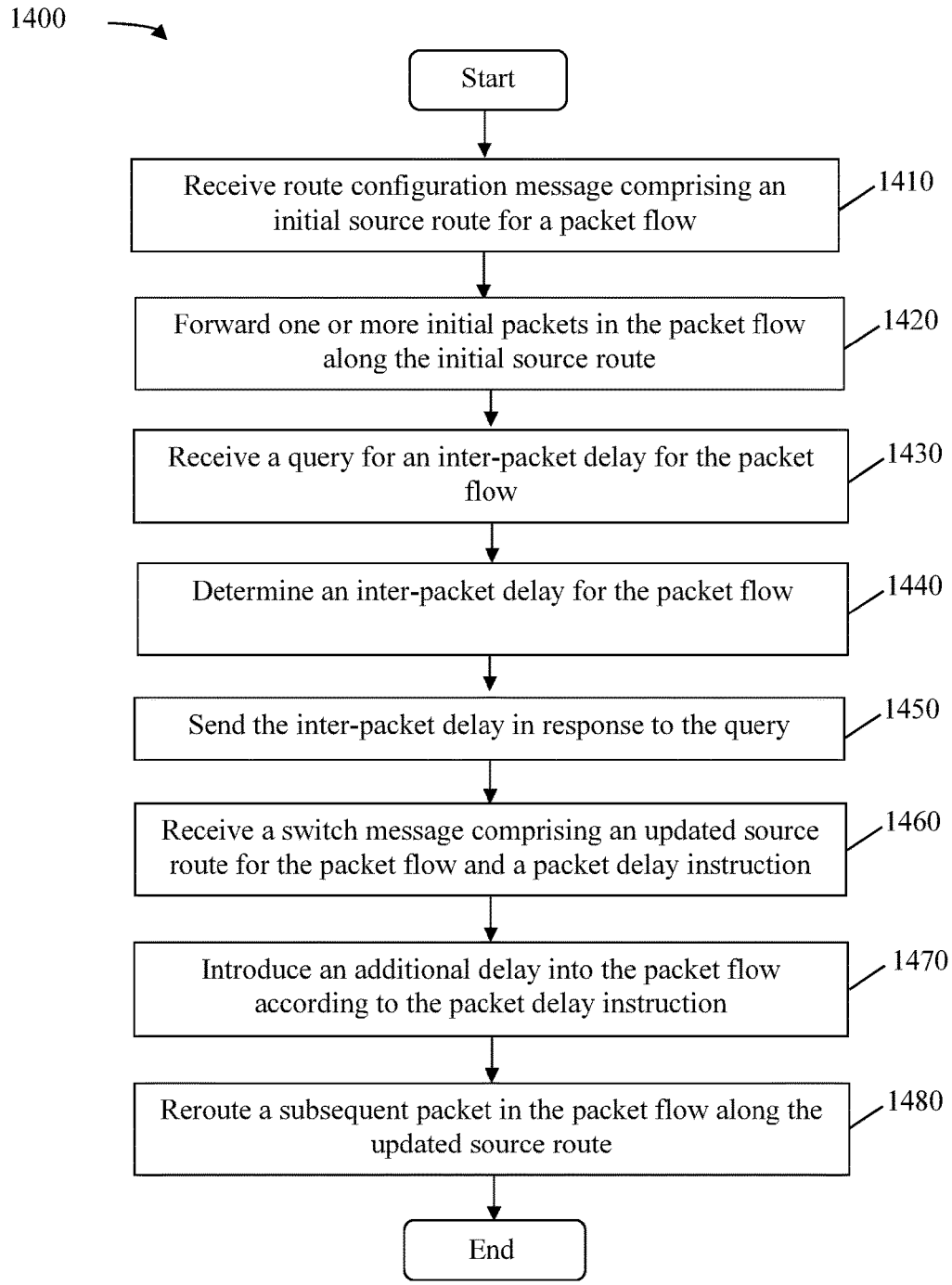
FIG. 14 is a flowchart of another embodiment of a method for adding a minimal amount of additional delay when rerouting a packet flow in a source routing network.

FIG. 14 is a flowchart of another embodiment of a method 1400 for adding a minimal amount of additional delay when rerouting a packet flow in a source routing network. The packet flow is similar to the packet flows 1140 and 1240, and the network is similar to the networks 100, 200, 400, 500, and 1100. The method 1400 is implemented by an ingress node, such as the ingress nodes 521, 621, 721, 821, 921, 1121, and 1221. The method 1400 may employ a substantially similar mechanism as described in the methods 600, 700, 800, 900, 1100, and 1200. The method 1400 is implemented when the ingress node is instructed to reroute the packet flow from an initial source route to an updated source route that comprises less path delay than the initial source route. The initial source route is similar to the initial routes 432, 532, 632, 732, 832, 932, 1132, and 1232, and the updated source route is similar to the updated routes 433, 533, 633, 733, 833, 933, 1133, and 1233. At step 1410, a route configuration message comprising an initial source route for a packet flow is received, for example, from a network controller such as the network controller 110, where the packet flow is from a source to a destination. At step 1420, one or more initial packets in the packet flow are forwarded along the initial source route. At step 1430, a query for an inter-packet delay for the packet flow is received. At step 1440, an inter-packet delay is determined for the packet flow. The inter-packet delay is an inherent delay between successive packets in the packet flow, where the inter-packet delay may be dependent on a packet generation rate. In an embodiment, the ingress node may obtain the inter-packet delay of the packet flow by monitoring the arrival times of the initial packets at the ingress node. At step 1450, the determined inter-packet delay is sent in response to the query. At step 1460, a switch message comprising an updated source route for the packet flow and a packet delay instruction is received. For example, the updated source route comprises less delay than the initial source route and the packet delay instruction indicates an amount of additional delay required for avoiding packet mis-ordering during the reroute. The amount of additional delay is computed according to Equation (2) and (3) described above. At step 1470, an additional delay is introduced into the packet flow according to the packet delay instruction by delaying transmissions of at least some packets in the packet flow. For example, a portion of the additional delay may be built up along the initial source route prior to the reroute as described in the method 1200 and the remaining portion of the additional delay may be introduced into the update source route upon the reroute as described in the method 1100. In some embodiments, the distribution of the additional delay may be indicated in the switch message. In some other embodiments, the distribution may be determined by the ingress node. The determination of the distribution may be dependent on the amount of inter-packet delay and/or buffer limitations at the ingress node, as discussed more fully below in the methods 1500 and 1600. At step 1480, a subsequent packet in the packet flow is rerouted along the updated source route.

It should be noted that the steps 1430 and 1450 may be optional, in which the amount of additional delay received in the packet delay instruction at step 1460 may not account for the inter-packet delay. Thus, the ingress node may minimize the amount of additional delay by executing the step 1440 between the steps 1460 and 1470 and accounting for the inter-packet delay by employing Equations (2) and (3) described above. In addition, the ingress node may employ substantially similar mechanisms as described in the methods 600, 700, 800, and 900 to delay the transmissions of the subsequent packet. The ingress node may remove the additional delay by decaying the additional delay over a period of time by employing a delay scheme similar to the delay scheme described in the graph 1000. Further, the method 1400 may be performed in the order as shown or any other suitable order as determined by a person of ordinary skill in the art.

Figure 15:
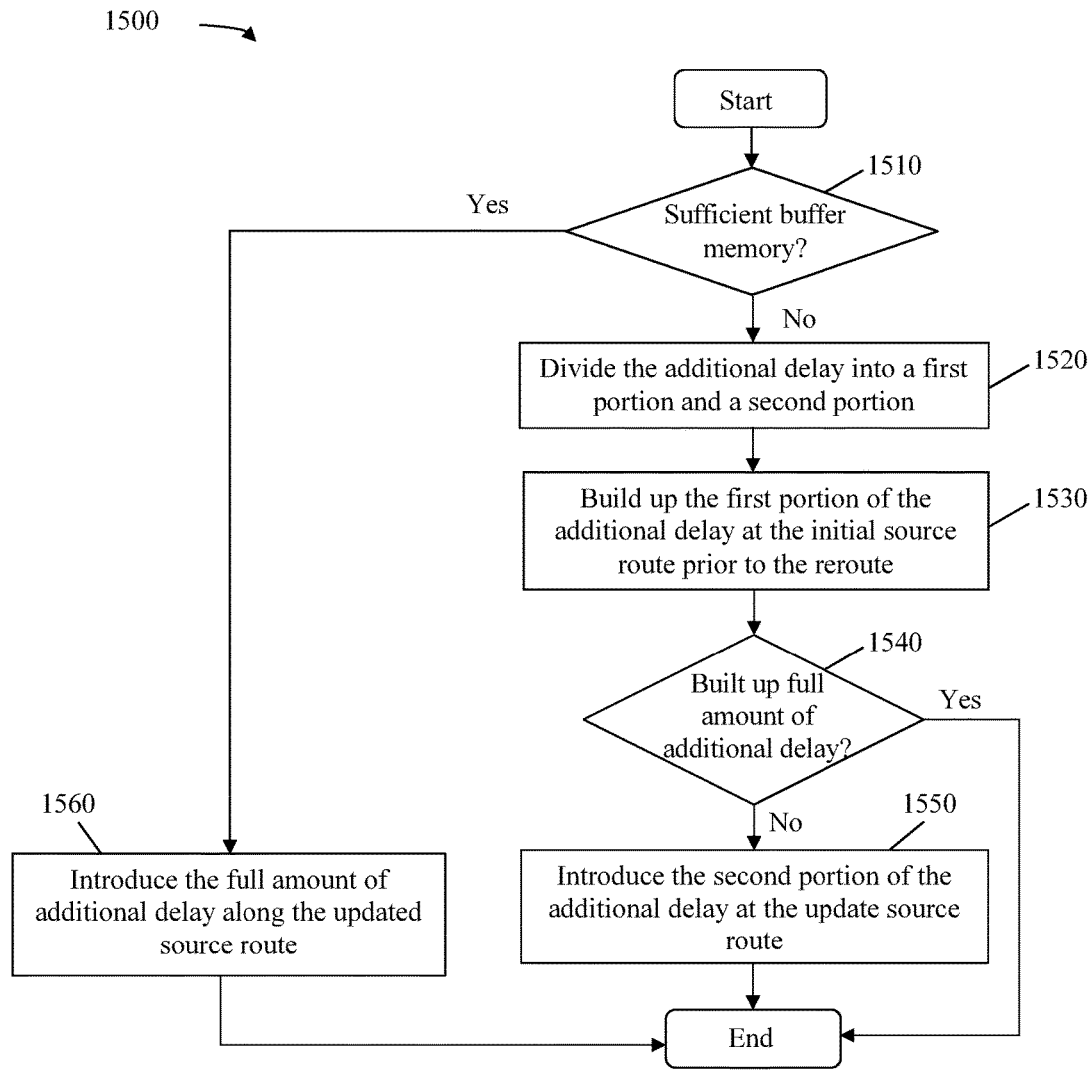
FIG. 15 is a flowchart of an embodiment of a method for distributing a minimal amount of additional delay between an initial source route and an updated source route.

FIG. 15 is a flowchart of an embodiment of a method 1500 for distributing a minimal amount of additional delay between an initial source route, such as the initial routes initial routes 532, 632, 732, 832, 732, 832, 932, and 1132, and an updated source route, such as the updated routes 533, 633, 733, 833, 933, and 1133. The method 1500 is implemented by an NE, such as the network controller 110, the ingress node 521, 621, 721, 821, 921, 1121, and 1221, and the NE 300. The method 1500 is implemented after determining that an additional delay is required to be applied to a packet flow (e.g., the packet flows 1140 and 1240) in a source routing network (e.g., the networks 100, 200, 400, 500, and 1100) during a route switch from the initial source route to the updated source route and the packet flow comprises an inter-packet delay that is greater than zero. For example, the inter-packet delay may be monitored by an ingress node for the packet flow. The method 1500 may be employed in conjunctions with the methods 1300 and 1400 to distribute delays between the initial source route and the updated source route. At step 1510, a determination is made whether a sufficient amount of buffer memory is available at the ingress node to support the full amount of additional delay. The amount of available buffer memory may be estimated by the ingress node and may be communicated to the network controller. If a sufficient amount of buffer memory space is available, next at step 1560, the full amount of additional delay is introduced at the updated source route when the packet flow is switched from the initial source route to the updated source route.

If the buffer memory space is determined to be insufficient at the ingress node at step 1510, the method 1500 proceeds to step 1520. At step 1520, the additional delay is divided into a first portion and a second portion, for example, based on the amount of buffer space available at the ingress node. At step 1530, the first portion of the additional delay is built up at the initial source route prior to the reroute. The additional delay may be built up at the initial source route by increasingly delaying packets transmitted along the initial source route as described in the method 1200. The rate at which the packets are delayed may be computed based on the amount of buffer memory available at the ingress node. At step 1540, a determination is made whether the full amount of additional delay (e.g., first portion is equal to the full amount) is built up at the initial source route. If the full amount of the additional delay is not built up, next at step 1550, the second portion of the additional delay is introduced at the updated source route. Otherwise, the method 1500 terminates.

Figure 16:
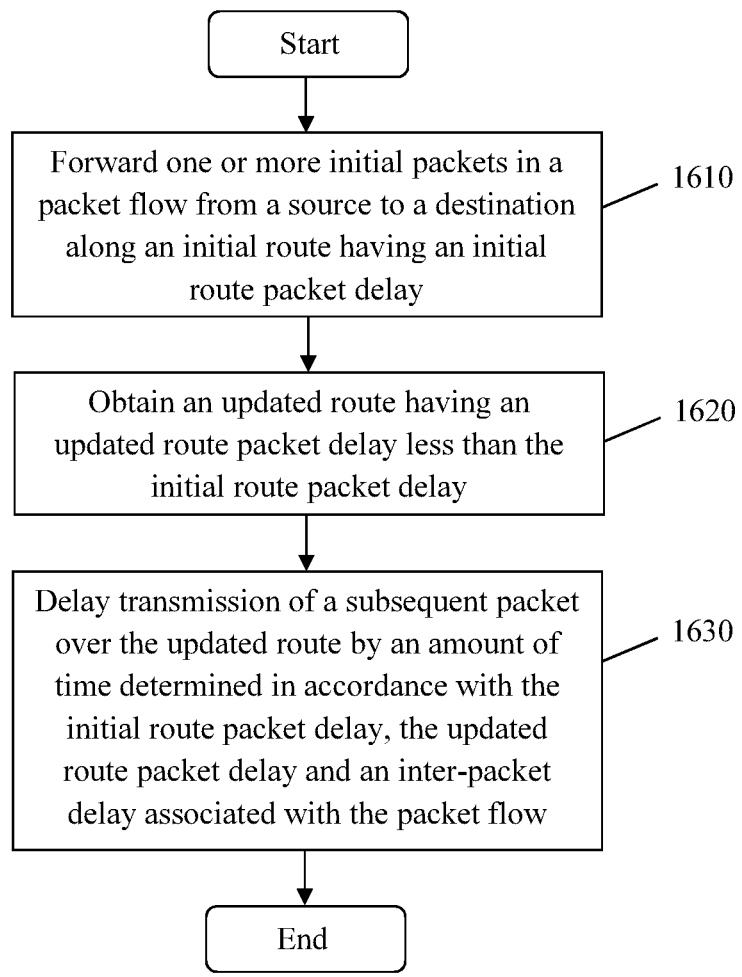
FIG. 16 is a flowchart of another embodiment of a method for adding a minimal amount of additional delay when rerouting a packet flow in a source routing network.

FIG. 16 is a flowchart of another embodiment of a method 1600 for adding a minimal amount of additional delay when rerouting a packet flow in a source routing network. The packet flow is similar to the packet flows 1140 and 1240, and the network is similar to the networks 100, 200, 400, 500, and 1100. The method 1600 is implemented by an ingress node, such as the ingress nodes 521, 621, 721, 821, 921, 1121, and 1221. The method 1600 may employ a substantially similar mechanism as described in the methods 600, 700, 800, 900, 1100, 1200, and 1400. The method 1400 is implemented when the ingress node is instructed to reroute the packet flow from an initial route to an updated route that comprises less path delay than the initial source route. The initial route is similar to the initial routes 432, 532, 632, 732, 832, 932, 1132, and 1232, and the updated route is similar to the updated routes 433, 533, 633, 733, 833, 933, 1133, and 1233. At step 1610, one or more initial packets in a packet flow are forwarded from a source to a destination along the initial route having an initial route packet delay. At step 1620, an updated route having an updated route packet delay less than the initial route is obtained. At step 1630, transmission of a subsequent packet over the updated route is delayed by an amount of time in accordance with the initial route packet delay, the updated route packet delay, and an inter-packet delay associated with the packet flow.

In an embodiment, when a network controller, such as the network controller 110 determines to reroute a packet flow (e.g., the packet flows 1140 and 1240), from an initial source route (e.g., initial routes 532, 632,732, 832, 732, 832, 932, and 1132) to a lower-delay updated route (e.g., the updated routes 533, 633, 733, 833, 933, and 1133) in a source routing network (e.g., the networks 100, 200, 400, 500, and 1100), the network controller may determine whether to allow an ingress node to utilize and/or create inter-packet delay in the packet flow during the reroute. For example, the network controller may send a packet delay message to request the ingress node to delay packet transmission, similar to the step of 1360. The packet delay message may include an inter-packet delay utilization flag indicating whether the ingress node may utilize the inherent inter-packet delay to reduce the amount of additional delay (e.g., according to Equation (3)) when introducing the additional delay into the packet flow to prevent packet mis-ordering during the reroute as described in the method 1100. In addition, the packet delay message may include an inter-packet delay creation flag indicating whether the ingress node may create artificial inter-packet delay into the packet flow at the initial route as described in the method 1200. The following table summarizes the flags that may be included in a packet delay message:

TABLE 2

Packet Delay Message Flags

| Flags | Descriptions |
| --- | --- |
| Inter-packet delay utilization flag | Indicate whether inter-packet delay may be utilized for reducing the amount of additional delay for a packet flow during a reroute |
| Inter-packet delay creation flag | Indicate whether inter-packet delay may be injected into the initial route during a reroute |

In such an embodiment, when the ingress node receives the packet delay message, the ingress node may introduce delays into the packet flow according to the inter-packet delay utilization flag. For example, the ingress node may compute the additional delay according to Equation (3) when the inter-packet delay utilization flag indicates that inter-packet delay may be utilized, otherwise, the ingress node may delay packet transmissions according to the path delay difference, for example, provided by the network controller. In addition, the ingress node may inject artificial inter-packet delay into the packet flow when the inter-packet delay creation flag indicates that inter-packet delay may be created, for example, by employing similar mechanisms as described in the method 1200.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE), comprising:

forwarding one or more initial packets in a packet flow from a source to a destination along an initial route having an initial route packet delay;
obtaining an updated route having an updated route packet delay less than the initial route packet delay; and
delaying transmission of a subsequent packet in the packet flow over the updated route by an amount of time determined in accordance with the initial route packet delay, the updated route packet delay, and an inter-packet delay when a path delay difference between the initial route packet delay and the updated route packet delay is greater than the inter-packet delay, the inter-packet delay being a delay between successive packets in the packet flow.

2. The method of claim 1, further comprising:
subtracting the updated route packet delay and the inter-packet delay from the initial route packet delay to produce a delay difference;
determining that the delay difference is greater than zero; and
delaying the transmission of the subsequent packet by a duration greater than the delay difference.

3. The method of claim 2, wherein the initial route packet delay is denoted as delay ($P_{old}$), wherein the updated route packet delay is denoted as delay ($P_{new}$), wherein the inter-packet delay is denoted as $\tau$, wherein the method further comprises determining the amount of time to delay the transmission of the subsequent packet, denoted as dt, by computing operations:

$$\begin{cases} dt = \text{delay}(P_{old}) - \text{delay}(P_{new}) - \tau + \varepsilon, & \text{if } \text{delay}(P_{old}) - \text{delay}(P_{new}) > \tau, \\ dt = 0, & \text{if } \text{delay}(P_{old}) - \text{delay}(P_{new}) \leq \tau, \end{cases}$$

and wherein $\varepsilon$ is a positive value greater than zero.

4. The method of claim 1, wherein obtaining the updated route comprises receiving a reroute message instructing the NE to reroute the packet flow from the initial route to the updated route, and wherein the reroute message comprises an inter-packet delay utilization flag indicating that the NE is allowed to utilize the inter-packet delay when determining the amount of time to delay the transmission of the subsequent packet such that packet mis-ordering is prevented in the packet flow.

5. The method of claim 1, further comprising:
subtracting the updated route packet delay and the inter-packet delay from the initial route packet delay to produce a delay difference;
determining that the delay difference is greater than zero;
delaying the transmission of the subsequent packet over the updated routed by a duration of a first portion of the delay difference; and
delaying transmissions of the initial packets over the initial route according to a second portion of the delay difference.

6. The method of claim 5, wherein delaying the transmissions of the initial packets over the initial route further comprises increasingly delaying the transmissions of the initial packets over the initial route such that the initial packets forwarded over the initial route arrive at the destination in increasing time intervals.

7. The method of claim 1, further comprising:
determining that the inter-packet delay associated with the packet flow is about zero; and
delaying transmissions of the initial packets over the initial route to create inter-packet delays between the initial packets when the inter-packet delay is determined to be about zero.

8. The method of claim 7, wherein the reroute message comprises an inter-packet delay creation flag indicating that inter-packet delay creation is allowed when the inter-packet delay associated with the packet flow is about zero.

9. The method of claim 1, further comprising:
subtracting the updated route packet delay and the inter-packet delay from the initial route packet delay to produce a delay difference;
determining that the delay difference is greater than zero;
determining that the NE comprises insufficient buffer memory to support delaying the transmission of the subsequent packet over the updated route by a full amount of the delay difference; and
delaying transmission of at least one initial packet over the initial route by a duration of at least a portion of the delay difference when the buffer memory is determined to be insufficient.

10. The method of claim 1, wherein the network is a software-defined networking (SDN)-based source routing network.

11. A network element (NE) comprising:
a transmitter configured to couple to a source routing network;
a receiver configured to couple to the source routing network; and
a processor coupled to the transmitter and the receiver, wherein the processor is configured to:
send a configuration message, via the transmitter, to an ingress node of the network to provide an initial source route for forwarding one or more initial packets in a packet flow from a source to a destination, wherein the initial source route has an initial source route packet delay;
send a switch message, via the transmitter, to the ingress node to indicate a reroute by providing an updated source route for forwarding a subsequent packet in the packet flow, wherein the updated source route has an updated source route packet delay that is less delay than the initial source route packet delay;
send, via the transmitter, a query message requesting for an inter-packet delay associated with the packet flow;
receive, via the receiver, the inter-packet delay associated with the packet flow in response to the query message, the inter-packet delay being a delay between successive packets in the packet flow; and
send a packet delay message, via the transmitter, to a first network node to instruct the first network node to delay transmission of the subsequent packet over the updated source route by any amount of time determined in accordance with the initial source route packet delay, the updated source route packet delay, and the inter-packet delay associated with the packet flow when a path delay difference between the initial route packet delay and the updated route packet delay is greater than the inter-packet delay.

12. The NE of claim 11, wherein the processor is further configured to:
subtract the updated source route packet delay and the inter-packet delay from the initial source route packet delay to produce a delay difference;

determine that the delay difference is greater than zero; and send the packet delay message to the first network node instructing the first network to delay the transmission of the subsequent packet over the updated source route by a duration that is greater than the delay difference.

13. The NE of claim 11, wherein the processor is further configured to:

subtract the updated source route packet delay and the inter-packet delay from the initial source route packet delay to produce a delay difference; and determine that the delay difference is greater than zero, wherein the packet delay message further instructs the first network node to delay transmissions of the initial packets over the initial source route according to at least a portion of the delay difference, and wherein the first network node corresponds to the ingress node.

14. The NE of claim 11, wherein the processor is further configured to:

subtract the updated source route packet delay and the inter-packet delay from the initial source route packet delay to produce a delay difference; and determine that the delay difference is greater than zero, wherein the packet delay message further instructs the first network node to delay the transmission of the subsequent packet by a duration of at least a portion of the delay difference, and wherein the first network node is positioned along the updated source route.

15. The NE of claim 11, wherein the processor is further configured to:

subtract the updated source route packet delay and the inter-packet delay from the initial source route packet delay to produce a delay difference;

determine that the delay difference is greater than zero, receive, via the receiver, buffer size information associated with the ingress node; and divide the delay difference into a first portion and a second portion according to the received buffer size information, and wherein the packet delay message further instructs the first network node to delay transmissions of the initial packets over the initial source route according to the first portion of the delay difference and delay the transmission of the subsequent packet over the updated source route by a duration of the second portion of the delay difference.

16. A network element (NE) comprising:

a transmitter coupled to a source routing network;

a receiver coupled to the source routing network; and a processor coupled to the transmitter and the receiver, wherein the processor is configured to:

forward, via the transmitter, one or more initial packets in a packet flow between a source and a destination along an initial source route having an initial source route packet delay, successive initial packets being separated by an inter-packet delay, the inter-packet delay being a delay between successive packets in the packet flow;

receive, via the receiver, a reroute request to forward a subsequent packet in the packet flow along an updated source route having an updated source route packet delay less than the initial source route packet delay;

obtain an additional delay associated with the inter-packet delay and a path delay difference between the initial source route packet delay and the updated source route packet delay; and delay transmission of the subsequent packet over the updated source route by an amount of time in accordance with the additional delay when a path delay difference between the initial source route packet delay and the updated source route packet delay is greater than the inter-packet delay.

17. The NE of claim 16, wherein the additional delay is greater than a difference between the path delay difference and the inter-packet delay.

18. The NE of claim 16, wherein the processor is further configured to introduce a portion of the additional delay along the initial source route by increasingly delaying transmissions of the initial packets along the initial source route such that the initial packets transmitted along the initial source route arrives at the destination in increasing time intervals.

19. The NE of claim 16, wherein the reroute request is received from a network management entity, wherein the processor is further configured to:

receive, via the receiver, the initial packets from the source;

determine the inter-packet delay by monitoring arrival times of the initial packets; and send the inter-packet delay to the network management entity, and wherein the additional delay is obtained from the network management entity.

20. The NE of claim 16, wherein the reroute request is received from a network management entity, wherein the NE further comprises a memory configured to store the initial packets and the subsequent packets, wherein the processor is further configured to:

send, via the transmitter, information associated with an amount of the memory available for storing the initial packets and the subsequent packets to the network management entity; and receive, via the receiver, a packet delay message instructing the NE to introduce a first portion of the additional delay at the initial source route and a second portion of the additional delay in the updated source route, and wherein the first portion and the second portion are associated with the amount of the memory available for storing the initial packets and the subsequent packets.

* * * * *